United States Patent
Mueller et al.

(10) Patent No.: US 12,530,701 B2
(45) Date of Patent: Jan. 20, 2026

(54) COMPUTER-BASED TECHNIQUES FOR GENERATING AND APPLYING DIGITAL COLOR PALETTES THAT CORRESPOND TO USER INTEREST DIGITAL COLOR

(71) Applicant: Target Brands, Inc., Minneapolis, MN (US)

(72) Inventors: Dominique Mueller, Minneapolis, MN (US); Edward Robert Charbonneau, Minneapolis, MN (US); Suyao Tian, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 174 days.

(21) Appl. No.: 18/490,219

(22) Filed: Oct. 19, 2023

(65) Prior Publication Data

US 2025/0131460 A1  Apr. 24, 2025

(51) Int. Cl.
  *G06Q 30/0202*  (2023.01)
  *G06T 11/00*  (2006.01)

(52) U.S. Cl.
  CPC ........ *G06Q 30/0202* (2013.01); *G06T 11/001* (2013.01); *G06T 2200/24* (2013.01)

(58) Field of Classification Search
  CPC ........... G06Q 30/0202; G06Q 30/0643; G06Q 30/0621; G06T 11/001; G06T 2200/24
  See application file for complete search history.

(56) References Cited

U.S. PATENT DOCUMENTS 8,090,196 B2 * 1/2012 Kojima ................... G06T 11/60
  382/311
8,897,552 B2 * 11/2014 Phillips ..................... G06T 7/90
  345/593

(Continued)

FOREIGN PATENT DOCUMENTS

CN    115661824 A  *  1/2023

OTHER PUBLICATIONS

Gurney, James. The Shapes of Color Schemes [Online]. Feb. 3, 2008 [Retrieved on Jun. 17, 2025]. Retrieved from the Internet: <URL: https://gurneyjourney.blogspot.com/2008/02/shapes-of-color-schemes.html > (Year: 2008).*

(Continued)

*Primary Examiner* — King Y Poon
*Assistant Examiner* — Michelle Hau Ma
(74) *Attorney, Agent, or Firm* — Barnes & Thornburg LLP

(57) ABSTRACT

The disclosed systems and methods provide for automatically generating digital color palettes associated with user interest colors. A method may include receiving, by a computer, a user interest digital color value, retrieving a color palette ruleset having rules to provide Boolean outputs indicating whether a color palette rule is satisfied by candidate color values, applying the color palette ruleset to the user interest color value, and identifying digital color values for a digital color palette associated with the user interest color value. Identifying the digital color values can include: identifying a complement color value to the user interest (Continued)

color, identifying a neutral gray color corresponding to the user interest color, mapping the user interest color, complement color, and neutral gray color in a 3D color plane, and applying triangulation techniques to identify a subset of color values within a triangular range according to the color palette ruleset.

20 Claims, 17 Drawing Sheets

(56) References Cited

U.S. PATENT DOCUMENTS

| | | | |
|---|---|---|---|
| 9,345,308 | B2 | 5/2016 | Benshetrit |
| 10,120,880 | B2 | 11/2018 | Dorner et al. |
| 10,242,396 | B2 | 3/2019 | Dorner et al. |
| 10,691,744 | B2 | 6/2020 | Dorner et al. |
| 10,755,303 | B2* | 8/2020 | Trevisiol ............ G06Q 30/0272 |
| 10,789,622 | B2 | 9/2020 | Ayush et al. |
| 10,964,064 | B1* | 3/2021 | Watling .............. G06F 16/5838 |
| 2009/0281925 | A1 | 11/2009 | Winter et al. |
| 2016/0267684 | A1* | 9/2016 | Li ............................. G09G 5/06 |
| 2017/0206677 | A1* | 7/2017 | Dziuba ................. G06T 11/001 |
| 2019/0130606 | A1* | 5/2019 | Walsh ................. G06F 16/5838 |
| 2020/0193473 | A1* | 6/2020 | Harris .................... G06N 20/00 |
| 2023/0000236 | A1 | 1/2023 | Winter et al. |
| 2024/0388636 | A1* | 11/2024 | Marsh ................... H04L 67/146 |

OTHER PUBLICATIONS

Ever After Pigment. Digital Drawdowns [Online]. Nov. 27, 2020 [Date retrieved from Wayback Machine. Accessed on Jun. 18, 2025]. Retrieved from the Internet: < URL: https://www.everafterpigments.com/pages/digital-drawdowns#:~:text=Sometimes%20the%20undertone%20can%20be,Fauna%20is %20a%20warm%20green > (Year: 2020).*

Liu, Shuqi et al. Image-Driven Harmonious Color Palette Generation for Diverse Information Visualization [Online]. Dec. 2, 2022 [Retrieved on Jun. 18, 2025]. Retrieved from the Internet: <URL: https://ieeexplore.ieee.org/abstract/document/9969167 > (Year: 2022).*

Kasper, Dan. Leveraging AI to Measure Your Company Culture [Online]. May 26, 2023 [Retrieved on Jun. 18, 2025]. Retrieved from the Internet: <URL: https://info.instill.ai/leveraging-ai-to-measure-your-company-culture#:~: > (Year: 2023).*

Wikipedia. Color normalization [Online]. Mar. 15, 2021 [Date retrieved from Wayback Machine. Accessed on Jun. 18, 2025]. Retrieved from the Internet: <URL: https://en.wikipedia.org/wiki/Color_normalization> (Year: 2021).*

Hernandez, Erica et al. Find Out If You're a $100 Winner + Create in Color with Sandy Allnock [Online]. Jul. 10, 2020 [Retrieved on Jun. 18, 2025]. Retrieved from the Internet: <URL: https://www.mftstamps.com/blogs/news/sandy-allnock-July-2020 > (Year: 2020).*

Sulikowski et al. Online Store Aesthetics Impact Efficacy of Product Recommendations and Highlighting [Online]. Nov. 26, 2022 [Retrieved on Nov. 10, 2025]. Retrieved from the Internet: <URL: https://pmc.ncbi.nlm.nih.gov/articles/PMC9741377/ > (Year: 2022).*

* cited by examiner

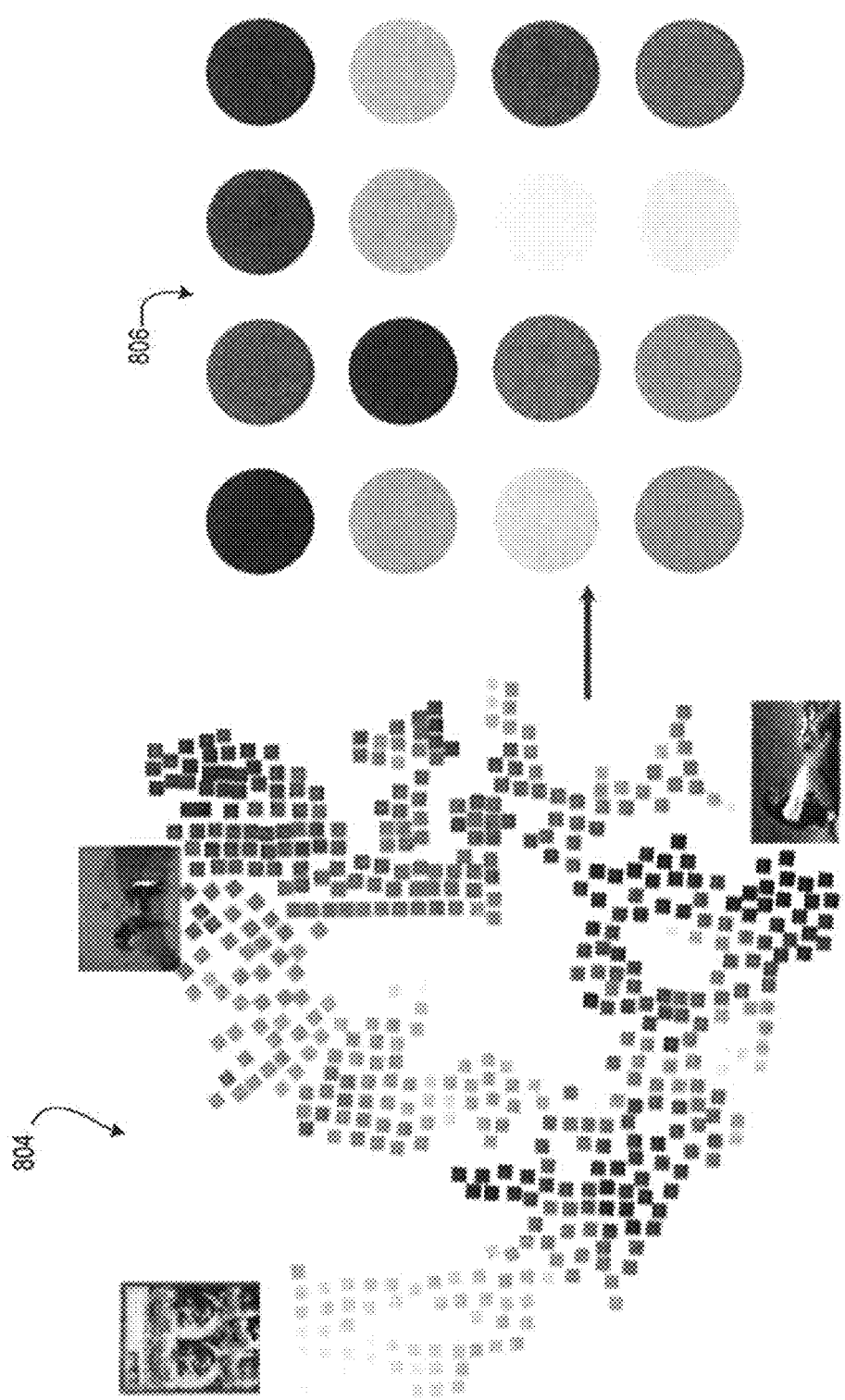

COMPUTER-BASED TECHNIQUES FOR GENERATING AND APPLYING DIGITAL COLOR PALETTES THAT CORRESPOND TO USER INTEREST DIGITAL COLOR

TECHNICAL FIELD

This disclosure generally describes systems, methods, and computer-based algorithms related to generating and updating color palettes based on at least one input color. Generated and updated digital color palettes can be configured for use in a variety of contexts, such as for designing and/or updating digital assets, products, packaging, and other elements in a physical and/or online retail environment.

BACKGROUND

A retail environment, such as a physical or online store, can provide various types of products for purchase to guests having differing interests, tastes, and/or styles. The products may be available in different colors. The colors may correspond to seasons, holidays, ethnicities, cultures, pop culture, art, history, user interests, hair color, eye color, etc. The products can be marketed and advertised in the different colors and various interests of the guests shopping or otherwise interacting with the retail environment.

Advertisements and other marketing materials can provide information to guests of a retail environment about products that are available for purchase. For example, an online advertisement can indicate that a particular product in an online retail environment is on sale for a limited amount of time. Sometimes, these advertisements and other marketing materials may be customized to particular guests' interests. Advertisements can be generated and provided to particular guests when they access the online retail environment and/or interact with one or more features in the online retail environment. The customized advertisements can promote products that the particular guest has purchased in the past or otherwise may be interested in purchasing.

SUMMARY

The disclosure generally describes technology for automatically generating and/or updating digital color palettes based on at least one or more input colors, which can provide one or more focal points around which the color palettes may be designed. For example, multiple different colors can be provided as input in digital color value formats (e.g., RGB digital color values, digital hue values, digital saturation values) that are used to determine and generate color palettes of complementary colors in one or more digital color schemes (e.g., digital achromatic color scheme, digital monochromatic color scheme, PANTONE™ color scheme) providing standardized color matching for digital and physical assets. The generated and updated color palettes can be used and applied in any of a variety of ways, such as being used for designing and/or updating digital assets, products, packaging, and other elements in a physical and/or online retail environment. For instance, the at least one input color can include user interest digital color values, such as favorite colors, eye color, hair color, and other user attribute colors. The at least one input color may additionally or alternatively include one or more colors associated with a particular culture, geographic region, location, etc. A computer-based algorithm, such as an artificial intelligence (AI) model, can be used by a computer system to curate a unique color palette that takes into consideration the user interest color values and the culture color values in light of various color theories. The computer-based algorithm may be trained to leverage color theory techniques and/or mathematical triangulation techniques to identify interactions between colors and their surroundings (e.g., user interest colors, culture colors, etc.) to determine, generate, and/or update a color palette. The disclosed technology may be used to generate central color palettes as well as adjacent color palettes, thereby broadening an amount of color palettes that may be used to promote particular user interest color values, undertone color values of the user interest color values, and/or culture color values in products, digital assets, packaging, marketing, and/or other elements of the retail environment.

Using the disclosed technology, cultural digital color values can be identified from historic data that generally corresponds to a particular culture, including but not limited to images, text, posters, foods, food packaging, actors, other famous people, folk art, contemporary art, fine art, architecture, etc. Frequently-represented color values can be extrapolated from this historic data and processed using the computer-based algorithm described herein. The algorithm may also be used to further process the color values to identify a common color value for the culture and/or a subset of most common color values for the culture. For example, the algorithm may identify commonalities amongst the color values, such as overlap and/or degree of overlap in RGB values. The identified digital color value(s) may be used with the disclosed technology to generate and/or update color palettes that take into consideration and/or are catered towards the particular culture. Furthermore, the algorithm described herein may be used to continuously evolve the color palettes based on evolution of different cultures, user interests, etc.

As an illustrative example of the disclosed technology, at least one input color can be received, such as a user interest color and one or more cultural colors. At least one complimentary color of the user interest color(s) can be identified and taken into consideration in a color palette as a user interest color undertone. An average of RGB values can be determined in a range of balanced perception and equilibrium to define the color palette that matches the set of input colors. Color contrast factors (e.g., contrast of value, quantity, chroma, hue, warm and cool, complementary and supplementary, chromostereopsis, simultaneous contrast, etc.) may also be considered to further refine one or more colors of the palette to ensure that the colors in the palette relate to each other visually and/or aesthetically.

Using digital color palettes that are determined with the disclosed technology, relevant products can be presented to particular users in online retail environments in color schemas that correspond to the guest's interests, cultural associations, etc. The color palettes can be used to customize the guest's online experience, in banners, storytelling, and other marketing features presented in the online retail environment. The color palettes can also be translated to other products that have certain substrates and/or are grouped according to one or more cultures, demographics, geographic regions, locations, and/or other user interests/attributes. The other products may include, but are not limited to mobile device cases, toys and/or games that resonate with particular cultures, clothes, food packaging, etc.

One or more embodiments described herein can include a method for automatically generating a digital color palette associated with at least one user interest digital color value, the method including: receiving, by a computer system, at least one user interest digital color value, retrieving, by the computer system and from a data store, a color palette ruleset, the color palette ruleset including a group of rules that can each be configured to be interpreted by a computer processor and, when interpreted by the computer processor, to provide Boolean outputs indicating whether a corresponding color palette rule is satisfied by candidate digital color values, applying, by the computer system, the color palette ruleset to the at least one user interest digital color value, the at least one user interest digital color value being provided in an input digital color format, identifying, by the computer system and based on applying the color palette ruleset, a group of digital color values for a digital color palette associated with the at least one user interest digital color value. Identifying the group of digital color values for the color palette can include: identifying a complement digital color value to the at least one user interest digital color value, identifying a neutral gray digital color value corresponding to the at least one user interest digital color value, mapping the at least one user interest digital color value, the complement digital color value, and the neutral gray digital color value in a three-dimensional (3D) digital color plane that can be represented in the input digital color format, and applying triangulation techniques to the mapped digital color values in the 3D digital color plane to identify a subset of digital color values that fall within a predefined triangular range in the 3D digital color plane according to one or more of the group of rules in the color palette ruleset. The method can also include generating the digital color palette in an output digital color scheme based on the identified subset of digital color values, where generating the digital color palette can include digitally translating the identified subset of digital color values from the input digital color format to the output digital color scheme, generating, by the computer system, a digital asset for an online retail environment based on applying the group of digital color values for the digital color palette associated with the at least one user interest digital color value to one or more modifiable elements of the digital asset, and returning, by the computer system, the digital asset for the online retail environment.

In some implementations, the embodiments described herein can optionally include one or more of the following features. The method can also include determining, by the computer system and based on applying the digital color palette ruleset, an undertone digital color value for the at least one user interest digital color value, and identifying, by the computer system, the group of digital colors values that may complement the undertone digital color value according to color theory techniques. Returning, by the computer system, the digital asset for the online retail environment can include transmitting the digital asset to an end user device, the end user device being configured to output the digital asset in a graphical user interface (GUI) display of the end user device.

The method can also include returning, by the computer system, the digital color palette to a developer computing device, where the developer computing device can be configured to output the digital color palette for selection and modification by a user of the developer computing device. The method can also include receiving, by the computer system and from the developer computing device, user input indicating selection of one of the group of digital color values for the digital color palette, and applying, by the computer system, the user-selected digital color value to one or more elements in the digital asset. The method can also include identifying, by the computer system, other digital color values amongst the group of digital color values for the digital color palette that may satisfy one or more color-balance criteria with the user-selected digital color value, and applying, by the computer system, the identified other digital color values to one or more other elements in the digital asset to complement the one or more elements in the digital asset having the user-selected digital color value.

In some implementations, the at least one user interest digital color value can include at least one of a user eye color, user hair color, favorite color, skin tone, skin undertone, and seasonal color. The method can also include generating, based on applying the digital color palette ruleset to the generated digital color palette, at least one adjacent digital color palette. The adjacent digital color palette can satisfy one or more of the color theory techniques in relation to the generated digital color palette. The method may include modifying, by the computer system, at least one previously generated digital asset using the group of digital color values for the digital color palette and based on applying the digital color palette ruleset.

As another example, receiving, by a computer system, at least one user interest digital color value may include: receiving a group of user interest digital color values, processing the group of user interest digital color values to determine an average user interest digital color value, and applying the digital color palette ruleset to the average user interest digital color value. Sometimes, returning, by the computer system, the digital asset for the online retail environment can include transmitting the digital asset to end user devices associated with users having an affinity with the at least one user interest digital color value.

The method may also include receiving, by the computer system, a cultural digital color value, and applying, by the computer system, the digital color palette ruleset to the at least one user interest digital color value and the cultural digital color value. Receiving, by the computer system, a cultural digital color value can include: receiving an indication of a particular culture of interest, identifying categories of cultural aspects that are associated with the particular culture, identifying, from a group of data sources, images that may correspond to each of the categories of cultural aspects associated with the particular culture, and normalizing digital color values in each of the images. Sometimes, the method may also include identifying, across the images, most repeated normalized digital color values, weighting the most repeated normalized digital color values, ranking the weighted digital color values from highest weighted value to lowest weighted value, and selecting a highest-ranked digital color value as a common digital color value associated with the particular culture. The method can include applying, by the computer system, the digital color palette ruleset to the at least one user interest digital color value and the common digital color value associated with the particular culture to generate the digital color palette. The method can include applying, by the computer system, an AI model to the cultural digital color value to determine a digital color palette for a culture associated with the cultural digital color value. The AI model can be trained in a process including: receiving training data, that includes images associated with at least one culture and digital color values identified for the at least one culture, and training the AI model to determine at least one digital color value that may correspond to the at least one culture based on (i) identifying one or more attributes or elements in the training data that may be representative of the at least one culture and (ii) excluding digital color values associated with one or more attributes or elements in the training data that are not identified as representative of the at least one culture.

The method can include receiving, by the computer system, data related to guest engagement, purchase history, and other guest metrics associated with the digital asset in the online retail environment, determining, by the computer system, an effectiveness metric for the digital color palette used in the digital asset, determining, by the computer system, whether the effectiveness metric satisfies one or more palette adjustment criteria, and adjusting, by the computer system, at least one of the group of digital color values for the digital color palette based on a determination that the effectiveness metric satisfies the one or more palette adjustment criteria. Determining, by the computer system, an effectiveness metric for the digital color palette used in the digital asset can include: measuring a click-through-rate (CTR) for the digital asset using the digital color palette, and comparing the measured CTR for the digital asset to other CTRs for other digital assets that use other digital color palettes that are different than the digital color palette. Sometimes, adjusting, by the computer system, at least one of the group of digital color values for the digital color palette can include: receiving additional signals, applying AI techniques to the additional signals to identify at least one digital color value amongst the additional signals that is adjacent or central to the digital color palette used in the digital asset, and adding the identified at least one digital color value to the digital color palette used in the digital asset. Adding the identified at least one digital color value to the digital color palette used in the digital asset can include swapping out a digital color value amongst the group of digital color values for the digital color palette with the identified at least one digital color value.

The devices, system, and techniques described herein may provide one or more of the following advantages. The disclosed technology can provide any of a variety of technical advantages in generating complementary digital color palettes. For instance, given a set of input colors, there are a nearly infinite number of possible complementary color palettes that can be generated and considered as candidate digital color palettes. The disclosed technology provides for systems and techniques that are able to efficiently generate and select one or more complementary digital color palettes in a manner that minimizes computing resources that are used (e.g., processor cycles, memory used, network bandwidth, processing time) while also generating color palettes that provide a pleasing, visual aesthetic relative to the input colors. For example, the disclosed technology can prune potential candidate digital color palettes from consideration, which can thereby minimize a number of candidate palettes that are evaluated and, thus, the computing resources that are used for the palette generation and evaluation. Such pruning can occur, for example, through use of the disclosed techniques and AI models that are described herein.

As another example of the disclosed technology providing technical advantages and solutions to technical problems, the disclosed technology can permit for using, as input, digital color values in any of a variety of formats, including inputting multiple different and disparate color values that the disclosed technology can synthesize, aggregate, and use, for generating digital color palettes that are of one or more standardized color schemes (e.g., digital achromatic color scheme, digital monochromatic color scheme, PANTONE™ color scheme). Input colors that can be provided for digital color palette generation can include any of a variety of sources, such as digital photographs provided by a plurality of different image sources/formats (e.g., digital cameras, resolution, lighting conditions) and of any of a variety of different subjects (e.g., people, places, buildings, physical artwork, packaging, food). As a result, the input imagery that can be used, and from which the input colors can be generated, may be disparate and from heterogeneous sources. The disclosed technology can combine these disparate and varied digital inputs, which themselves can each include a multitude of different digital colors that are represented (e.g., digital photograph of a red object may provide a large number of different digital red values across differently lit, shaded, and refracted regions of the object), such as through the use of digital color normalization, aggregation, and AI analysis techniques, to efficiently and effectively generate a smaller set of digital color inputs used to generate complementary digital color palettes. Additionally, the disclosed technology can map these disparate and potentially non-standardized input colors into digital colors that are part of one or more standardized color schemes, which can be more readily and consistently reproduced when applied to digital and physical assets.

The computer-based algorithm may further be trained using mathematical triangulation techniques and AI to cross-reference and process/normalize digital color values from a variety of different data input types (e.g., color, text, products, packages, design elements, digital assets, digital advertisements, foods, etc.) to identify commonalities and establish colors that may be grouped together in a palette. Similar techniques may be used to dynamically modify and automatically adapt the color palette over time, in line with ever-changing interests and/or factors relevant to a particular guest and/or culture. The algorithm may be trained with robust sets of training data iteratively, continuously, and/or at predetermined time intervals so that the algorithm can continue to learn the user interests and/or cultural aspects that may influence what colors are part of a color palette and/or how the color palette is applied to the digital assets and other elements in the retail environment. Over time, the algorithm may accurately and efficiently generate and modify color palettes and seamlessly apply the color palettes to the elements in the retail environment to improve the guest experiences.

The disclosed computer-based algorithm(s) may incorporate a feedback loop to continuously and automatically refine color palettes and color palette selection, thereby causing digital assets and other elements in the retail environment to adapt to changes in user interests, cultural aspects, guest engagement with the elements in the retail environment, purchase history of the guests, seasonality, etc. The feedback loop can receive various inputs, including but not limited to guest metrics that may define effectiveness of various color palettes that are used in the elements presented to the guest(s).

Similarly, using the disclosed technology, the color palettes may be used as a design resource tool to fulfill diverse guest needs and interests in various aspects of the retail environment, including but not limited to apparel, home products and design, and packaging. The developed color palettes may be rooted in emotional connections to colors. The diversity of the color palettes may be achieved by taking into consideration colors that enhance user interest color values and their corresponding undertones, cultural colors, etc. The resulting diverse color palettes, and use of these in designing and/or updating elements of the retail environment, can improve guest experiences and promote interest and purchase of products in the retail environment. Furthermore, the color palettes may be layered into existing color stories, in relevant product categories and digital assets, and within particular brands and/or products.

Moreover, the color palettes that are determined using the disclosed technology may functionally and aesthetically improve guest experiences and guest purchasing decisions by leveraging colors that resonate with the guest's particular interests, geographic region, location, cultural interests, etc. The computer-based algorithms described herein can be trained to define colors that compliment the user interest digital color values, culture digital color values, etc. to provide an aesthetically pleasing experience when interacting with the retail environment. Similarly, the generated color palettes can be used to automatically update and enhance stories, products, and other digital assets in the retail environment with custom and relevant colors to particular guests browsing the retail environment.

As another example, AI techniques can be used to extend application of the color palettes in virtual space to enhance guests' experiences and selections to interiors outside of retail spaces (e.g., a virtual living room or bedroom, from wall color to furniture and accessories in that given space). The disclosed technology may greatly reduce time and compute processing resources needed to gather a larger dataset of cultural colors articulated or identified by the user, then narrow down the large dataset of colors to a subset of colors specific to the user's experience and interests.

The details of one or more implementations are set forth in the accompanying drawings and the description below. Other features and advantages will be apparent from the description and drawings, and from the claims.

BRIEF DESCRIPTION OF THE DRAWINGS

FIG. 8B illustrates an example color map for a particular culture.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to systems, methods, and computer-based techniques for generating and updating color palettes, which can be applied to various digital assets, products, and other elements in a retail environment (e.g., physical retail environment, online retail environment). The disclosed technology may receive input colors, including but not limited to user interest digital color values and/or culture digital color values. The input colors can be provided to an AI algorithm and/or model to determine complement colors, undertones, and a set of colors to define as a color palette in association with the input colors. The color palette may then be used to update and/or design/create one or more digital assets, products, marketing materials, packaging, advertisements, content stories, or other elements in the retail environment. The AI algorithm and/or model may be trained to use color theory, color science, and/or mathematical triangulation techniques to identify how various colors interact with each other in relation to the input colors and other factors (e.g., surroundings, pop culture, geography, location, user interests, user attributes) to define a preferred color palette that corresponds to the input colors.

Figure 1A:
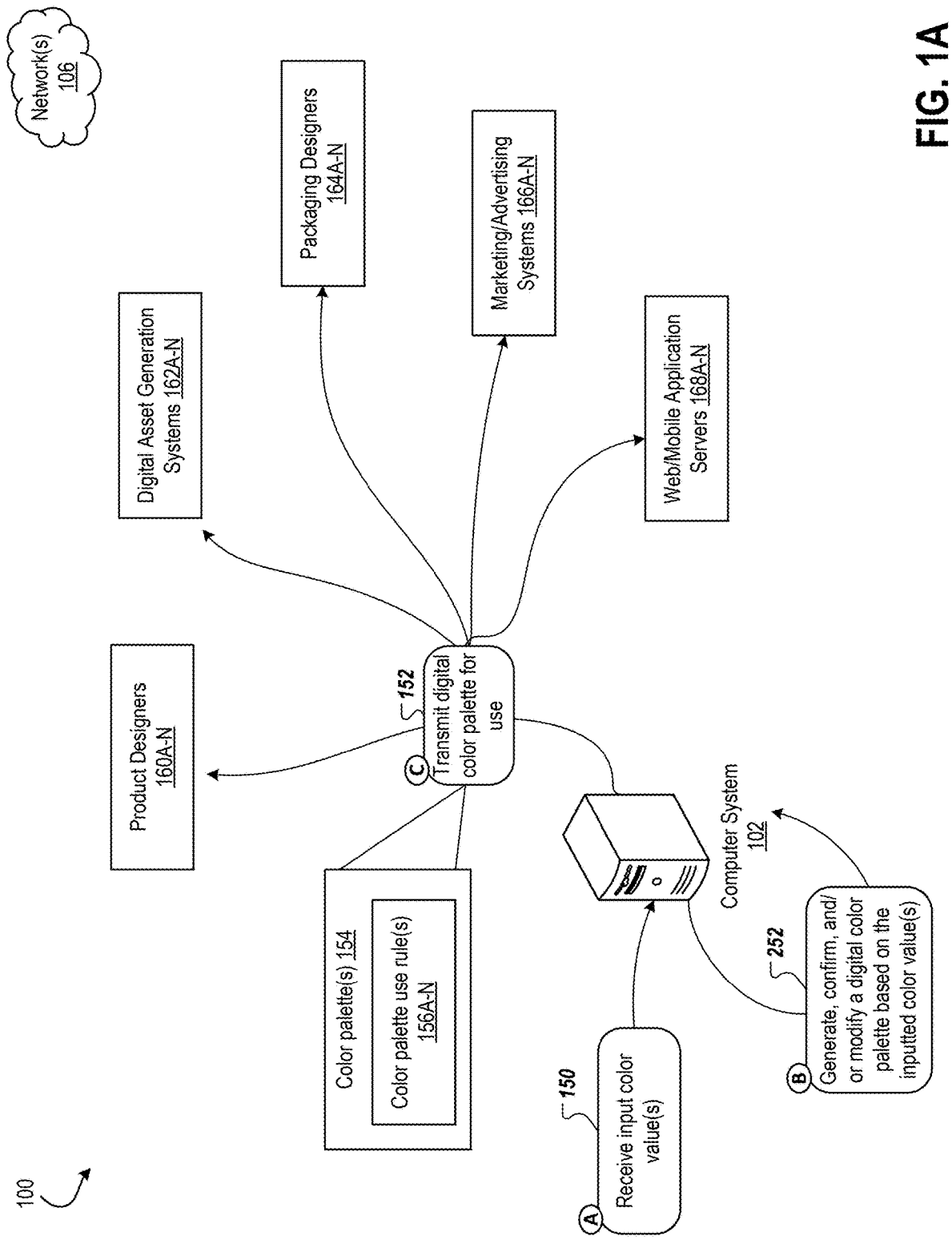
FIG. 1A is a conceptual diagram of a system for generating and using color palettes for a retail environment.

Referring to the figures, FIG. 1A is a conceptual diagram of a system 100 for generating and using color palettes for a retail environment. The system 100 includes a computer system 102 that can communicate, via network(s) 106, with various systems, devices, and/or users in the system 100. The computer system 102 can be configured to perform the disclosed techniques. For example, the computer system 102 can implement algorithms and/or models to generate color palettes based on receiving input colors. Sometimes, the computer system 102 may apply the color palettes to various elements associated with the retail environment.

More generally, the computer system 102 may receive input color value(s) in block A (150). The input color value(s) can be received from one or more sources, as described further below.

The computer system 102 can generate, confirm, and/or modify a digital color palette 154 based on the inputted color value(s) (block B, 151). As described herein, the computer system 102 may receive the inputs, such as user interest color values and/or culture color values, process those inputs, and generate/confirm/update the color palette based on processing the inputs. The color palette 154 can then be transmitted to one or more other systems for use in the retail environment (block C, 152).

The color palette 154 can be a digital representation or format of color values. The color palette 154 can be transmitted with use rules 156A-N. The rules 156A-N may indicate how colors in the color palette 154 may be used in the retail environment. The rules 156A-N may indicate what brands and/or product categories the color palette 154 may be applied to. As an illustrative example, one of the rules 156A-N may indicate that one or more particular colors in the color palette 154 should be applied to particular aspects/parts of a product or digital asset when the product or digital asset is selected for presentation to a guest of a particular interest, cultural background, geography, location, etc. The rule may indicate which color(s) to apply to primary elements of the product or digital asset and which colors to apply to secondary elements of the product or digital asset (e.g., for a collared shirt, a primary element can be a body of the shirt while the secondary element may be the collar and/or buttons on the shirt). Various other rules may also be defined, automatically by the computer system 102 and/or by one or more relevant users described herein. The rules may be defined and/or dynamically updated based on guest data indicating guest reactions, engagements, and/or purchases that relate to the product or digital asset utilizing the color palette 154. For example, if more guests purchase a shirt having a red color for the body and an orange collar versus a shirt having an orange color for the body and a red collar, the computer system 102 can adjust the rule(s) 156A-N associated with the color palette 154 having the red and orange colors accordingly. The rule(s) 156A-N may be adjusted so that the red color is applied to primary elements, such as the body of the shirt, and the orange color is applied to secondary elements, such as the collar of the shirt.

The color palette 154 and its corresponding rule(s) 156A-N can be transmitted to product designers 160A-N, digital asset generation systems 162A-N, packaging designers 164A-N, marketing/advertising systems 166A-N, and/or web/mobile application servers 168A-N.

In brief, the product designers 160A-N can include computing devices and/or systems of product designers who may translate the color palette 154 to clothes and other types of products (e.g., mobile device cases, dolls associated with one or more user interests and/or cultures, clothes and accessories of the dolls or other similar toys) having certain types of substrates and/or that which may be grouped according to one or more user interests, user attributes, cultures, etc.

The digital asset generation systems 162A-N can include any type of computing system and/or device described herein that may be used to design, generate, update, and/or modify digital assets that are selected and presented in online retail environments. Refer to at least FIG. 9 for an example digital asset (e.g., a banner including products available for purchase in the retail environment) that has been updated by the digital asset generation systems 162A-N to incorporate colors from a determined color palette.

The packaging designers 164A-N can include computing devices and/or systems of packaging designers who may design packaging for different products available for purchase in the retail environment. The packaging designers 164A-N may receive the color palette 154 and the rule(s) 156A-N, then decide accordingly how to apply colors from the palette 154 to particular packaging (e.g., food packaging, box for a doll or other toy, book cover, label on clothing items and/or accessories).

The marketing/advertising systems 166A-N can include any type of computing device and/or system described herein, which may be configured to design, create, update, and/or modify marketing and/or advertisements for the retail environment. The systems 166A-N can utilize the rule(s) 156A-N to determine how to apply the color palette(s) 154 to various different marketing and/or advertising campaigns. Refer to at least FIG. 9 for further discussion.

The web/mobile application servers 168A-N can include any type of computing system and/or network of computing systems and/or devices that may be configured to generate and/or serve web and/or mobile applications for the retail environment to various end users or guests' computing devices. The servers 168A-N can apply the rule(s) 156A-N to determine how and where to apply the color palette(s) 154 to various elements presented in or otherwise part of the web and/or mobile applications.

In some implementations the color palette(s) 154 can be applied to various different environments provided by the web/mobile application servers 168A-N to different users. For example, the color palette(s) 154 can be applied to virtual environments for interior design, retail space design, and virtual and/or metaverse spaces. In some implementations, the color palette(s) 154 can be applied to physical materials, substrates, and/or elements in physical environments (e.g., specific guests' homes, on their walls, furniture, rugs, paintings, accessories, clothing, etc.). As an illustrative example, the color palette(s) 154 (or one or more colors from the palette) can be transmitted to a printing device or other machine used for generating materials used to make fabrics for furniture. A particular user can indicate a piece of furniture for which they would want to reupholster in one or more colors form the color palette(s) 154. The user can indicate/select the furniture in a mobile application presented at their device, which can provide an AI-generated, three-dimensional rendition of the user's living room. Once the user selects the furniture, the mobile application can provide options for the user to select a color in the color palette(s) 154 to apply to the fabric of the selected furniture. Once the user makes and approves a selection, the selected color and corresponding RGB color data can be transmitted to a machine that produces the fabric for the selected furniture. Instructions can be generated and executed by the machine to produce the fabric in the user-selected color.

Figure 1B:
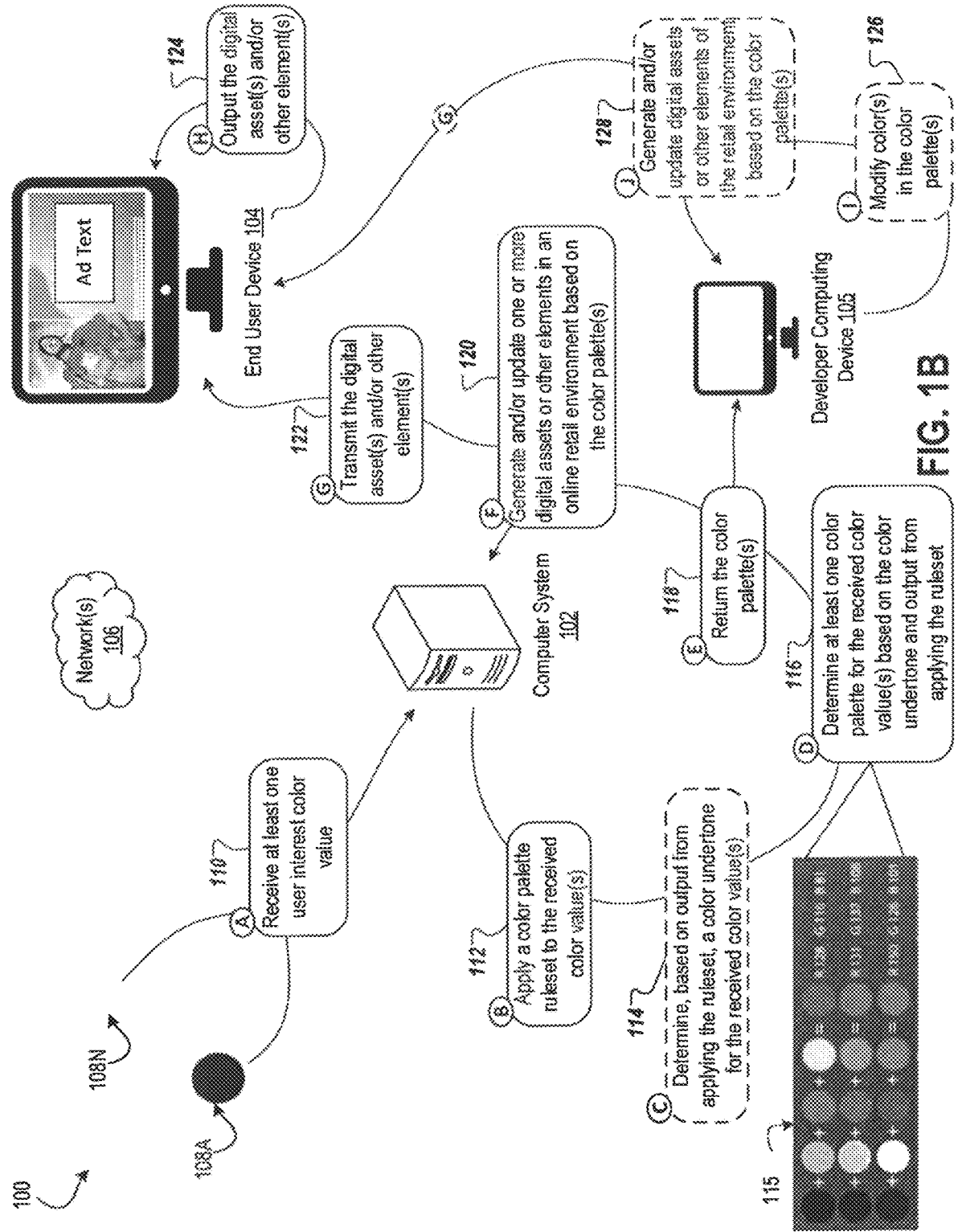
FIG. 1B is a conceptual diagram of a system for determining a color palette based on at least one input color value.

FIG. 1B is a conceptual diagram of the system 100 for determining at least one color palette 115 based on at least one input digital color value 108A-N. In the example system 100 of FIG. 1B, the computer system 102 may communicate with an end user device 104 and/or a developer computing device 105 via the network(s) 106. In brief, the end user device 104 can be any type of computing device, computing system, mobile device, laptop, tablet, mobile phone, and/or wearable device that may be used by guests of an online retail environment. The developer computing device 105 can include any one or more of the systems described in FIG. 1A, including but not limited to the product designers 160A-N, the digital asset generation systems 162A-N, the packaging designers 164A-N, the marketing/advertising systems 166A-N, and/or the web/mobile application servers 168A-N. Sometimes, the computer system 102 may include one or more of the described systems.

The computer system 102 can receive at least one user interest color value 108A-N in block A (110). These input color values 108A-N can include colors that correspond to user interests and/or user attributes. For example, the input color values 108A-N may include favorite colors of a guest (e.g., user), eye color, hair color, preferred color for different products, and/or undertones of one or more colors mentioned herein. The input color values 108A-N may additionally or alternatively include one or more cultural color values, demographic color values, ethnic color values, geographic color values, location-based color values, etc.

The computer system 102 may apply a color palette ruleset to the received color value(s) 108A-N (block B, 112). The ruleset can include rules that may each be configured to be interpreted by a processor of the computer system 102 and, when interpreted by the computer's processor, to provide Boolean outputs indicating whether a corresponding color palette rule is satisfied by candidate digital color values. The computer system 102 may apply an AI algorithm and/or model described herein (refer to at least FIGS. 3A and 3B). As another example, the computer system 102 can apply one or more color theory rules, complementary color rules, triangulation techniques, etc. to the received color value(s) 108A-N. Refer to at least FIGS. 2A and 2B for further discussion about applying the rules to the color value(s) 108A-N.

In block C (114), the computer system 102 may optionally determine, based on output from applying the ruleset, a color undertone for the received color value(s) 108A-N. Sometimes, the undertone may be predetermined and/or provided as one of the color value(s) 108A-N in block A (110).

In block D (116), the computer system 102 may determine at least one color palette 115 for the received color value(s) based on the color undertone and the output from applying the ruleset. The computer system 102 may determine a central color palette that corresponds to the received color value(s) 108A-N (e.g., preferred colors for a particular eye color and a particular culture of interest). The central color palette can be closest to a center in triangulation techniques applied to the received color value(s). The center of a triangulation of the received color value(s) can provide a balanced human perception in color space. The computer system 102 may additionally determine one or more adjacent color palettes. The adjacent color palettes may be adjacent to the central color palette. While adjacent color palettes may still be within the triangulation of the received color value(s), the adjacent color palettes may push the boundaries and provide more variation in color combinations. Accordingly, in some implementations, more accent and fashion/clothing colors can be identified from adjacent color palettes. The adjacent color palettes may serve varying purposes based on user preferences (e.g., used as accent colors for accessories or clothing items, used as primary colors for clothing or furniture). Moreover, in some implementations, additional color palettes can be built out beyond the central color palette and two adjacent color palettes, so long as the additional color palettes are also within the triangulation boundaries of balanced human eye perception for the received color value(s).

The illustrative color palettes 115 include three palettes, a central color palette and two adjacent palettes. Colors for each of the palettes are combined (e.g., summated, averaged) to find an RGB value for that palette. The computer system 102 can summate the color palette(s) values to determine one or more average RGB values for the palette(s), which can also be described as aRGB. The aRGB can fall within the boundaries of the triangulation of the received color value(s) to ensure balanced human eye perception. For example, the first adjacent color palette has an RGB value of 128 (R), 116 (G), and 81 (B). The central color palette has an RGB value of 131, 137, and 108. The second adjacent color palette has an RGB value of 150, 126, 101. Refer to at least FIGS. 7A and 7B for further discussion about determining the central and adjacent color palettes, as well as determining color palettes more generally.

The computer system 102 can return the color palette(s) 115 in block E (118). Returning the color palette(s) 115 can include storing it in a data store, as described in reference to FIG. 10. Returning the color palette(s) 115 may include transmitting it to the developer computing device 105, as described above.

The developer computing device 105 may optionally modify one or more colors in the color palette(s) 115 (block I, 126). For example, a relevant user at the device 105 may determine that they want to add, remove, and/or swap a color from the palette(s) 115. The user may do so by providing input at the device 105. Sometimes, the user's decisions about modifying the color(s) may be limited by one or more rulesets associated with the color palette(s) 115, color theory techniques, and/or the retail environment more generally.

Optionally, the device 105 may generate and/or update one or more digital assets or other elements in the retail environment based on the color palette(s) 115 (block J, 128). Refer to FIG. 1A for further discussion.

Referring back to the computer system 102, once the computer system 102 returns the color palette(s) 115 in block E (118), the computer system may generate and/or update one or more digital assets and/or other elements in the online retail environment based on and using the color palette(s) 115 (block F, 120). Refer to FIG. 1A for further discussion.

Once the digital asset(s) and/or other elements are generated and/or updated, the computer system 102 may transmit those asset(s) and/or elements to the end user device 104 (block G, 122). Sometimes, the generated and/or updated asset(s) and/or elements may be transmitted to a server (e.g., the web/mobile application servers 168A-N in FIG. 1A), which may then generate and/or modify a graphical user interface (GUI) display for presentation and output at the end user device 104 that includes the asset(s) and/or elements (e.g., according to presentation requirements and/or a designated channel of the end user device 104, such as a desktop webpage channel, a mobile application channel, a webpage application channel).

Figure 9:
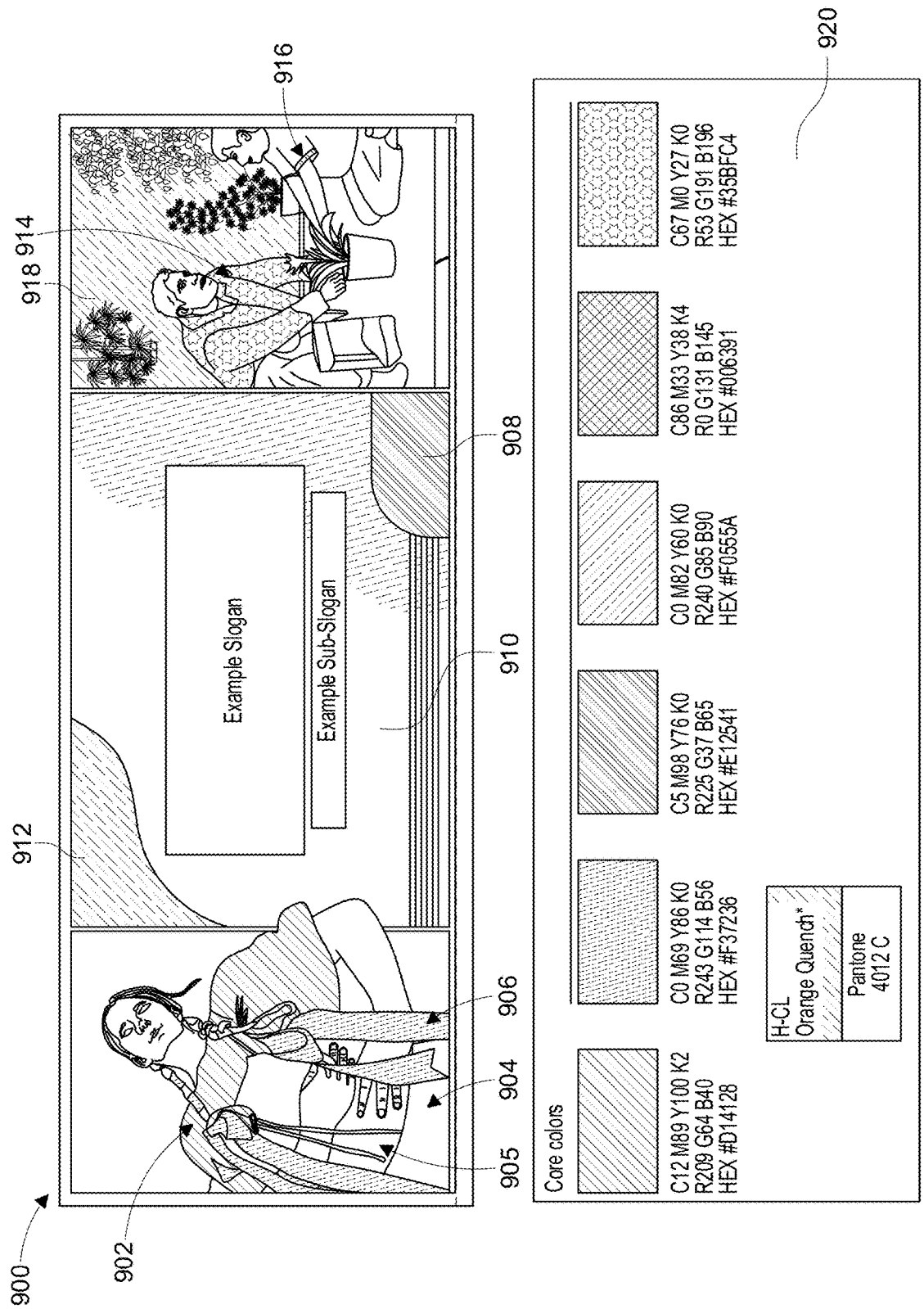
FIG. 9 is an example digital asset modified using colors from a color palette determined as described herein.

Accordingly, the end user device 104 can output the digital asset(s) and/or other element(s) in block H (124). The digital asset may be a banner having multiple products available for purchase at the retail environment during a particular holiday. Portions of the banner, such as a particular clothing article, a background, text, etc., may be updated (e.g., by the computer system 102) to one or more of the colors in the color palette(s) 115. This updated banner may then be presented in a GUI display at the end user device 104 of a guest shopping in the retail environment for products that may be associated with the particular holiday. Refer to FIG. 9 for further discussion about updating the portions of the digital assets for presentation in the online retail environment.

Figure 1C:
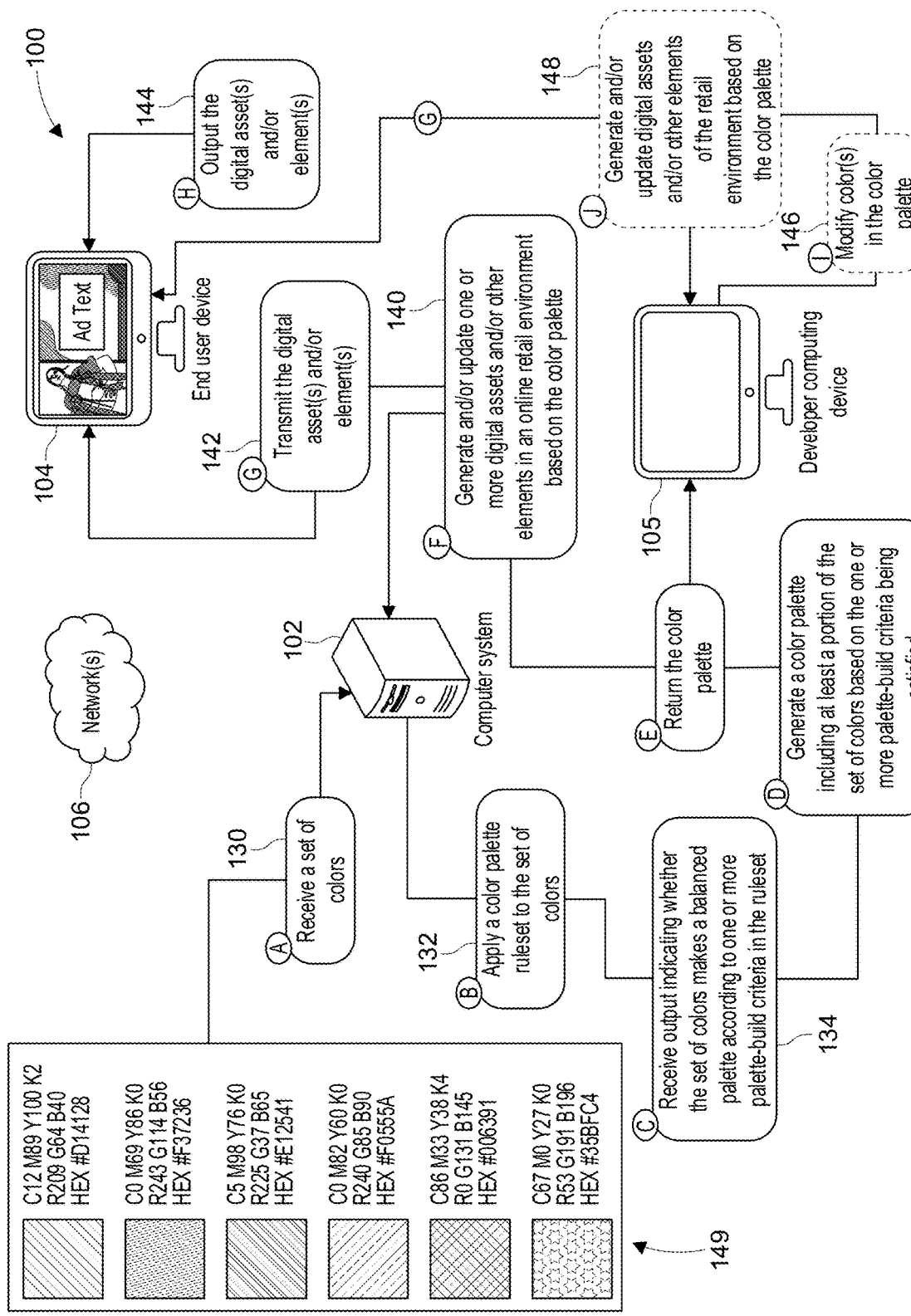
FIG. 1C is a conceptual diagram of a system for determining whether a set of colors comprises a color palette that satisfies one or more palette-build criteria.

FIG. 1C is a conceptual diagram of the system 100 for determining whether a set of colors 149 comprises a color palette that satisfies one or more palette-build criteria. Similar to the system 100 in FIG. 1B, the system 100 of FIG. 1C includes the computer system 102, which may communicate, via the network(s) 106, with the end user device 104, and/or the developer computing device 105.

In FIG. 1C, the computer system 102 can receive the set of colors 149 in block A (130). Sometimes, the computer system 102 can continuously receive sets of colors. In some implementations, the computer system 102 can receive sets of colors seasonally, monthly, and/or at predetermined time intervals (e.g., quarterly, every 2 weeks, every 6 weeks, every other month). The computer system 102 can sometimes receive sets of colors whenever a retail environment and/or user requests a color palette. The set of colors 149 may be predefined, automatically by the computer system 102 using the disclosed techniques and/or manually by a relevant user in an online retail environment. As an illustrative example, the set of colors 149 may have been previously defined by the computer system 102 according to the techniques described in reference to FIG. 1B. Block A (130) in FIG. 1C can then be performed at a later time, such as when the set of colors 149 should be checked for alignment/compliance with changes in related colors, cultures, user interests, products, holidays, seasons, weather, etc.

The computer system 102 can apply a color palette ruleset to the set of colors 149 in block B (132). The ruleset may be an AI algorithm or model, as described herein.

Based on applying the ruleset, the computer system 102 may receive output indicating whether the set of colors 149 makes a balanced, preferred, and/or still-relevant palette according to one or more palette-build criteria in the ruleset (block C, 134). For example, the computer system 102 can determine whether the colors in the set 149 balance each other out with a gray undertone. The gray undertone can be determined by the computer system 102, as described in reference to at least FIGS. 4, 5, 6, 7A, and 7B. As another example, the computer system 102 can determine whether each color in the set 149 is still relevant and/or related to colors that are identified for particular user interests, culture, etc. that are associated with the set of colors 149. The computer system 102 can perform one or more of the operations described in reference to FIGS. 2A, 2B, 3A, and 4 to identify the currently relevant colors for the user interests, culture, etc., then perform a comparison (e.g., comparing RGB values within threshold color value ranges, performing mathematical triangulation techniques) with the colors in the set 149.

In block D (136), the computer system 102 may generate a color palette including at least a portion of the set of colors 149 based on the one or more palette-build criteria being satisfied. Sometimes, the color palette generated herein can be the entire set 149. Sometimes, the computer system 102 can add one or more colors from the set 149 to an existing color palette for the particular user interests, culture, etc. or for another user interest, culture, etc. Sometimes, the computer system 102 can create an entirely new palette with one or more colors from the set 149. The computer system 102 may generate the color palette by selecting at least one color from the set 149 that is most closely related (e.g., based on a comparison of RGB values) to colors already in the palette and/or colors most relevant to the particular user interest, culture, etc. at the present time. As another example, the computer system 102 can select at least one color from the set 149 that is a best or preferred complement to one or more colors in an already-existing color palette and/or relevant to the particular user interest, culture, etc. In yet some implementations, the computer system 102 can create a new color for the palette that is similar to, a complement of, and/or has similar RGB values as one or more colors in the set 149.

The computer system 102 returns the color palette in block E (138). The computer system 102 can return the palette to the developer computing device 105. Optionally, the developer computing device 105 may modify one or more colors in the color palette (block I, 146). Optionally, the device 105 may generate and/or update one or more digital assets and/or other elements of the retail environment based on the color palette in block J (148). The generated and/or updated assets and/or elements can then be transmitted to the end user device 104.

The computer system 102 can also generate an/or update one or more digital assets and/or other elements in the online retail environment based on the color palette (block F, 140). The digital asset(s) and/or the other element(s) may then be transmitted to the end user device 104 (block G, 142), which can be outputted thereto (block H, 144). Refer to FIG. 1B for further discussion about blocks E, F, G, H, I, and J (138-148).

Figure 2A:
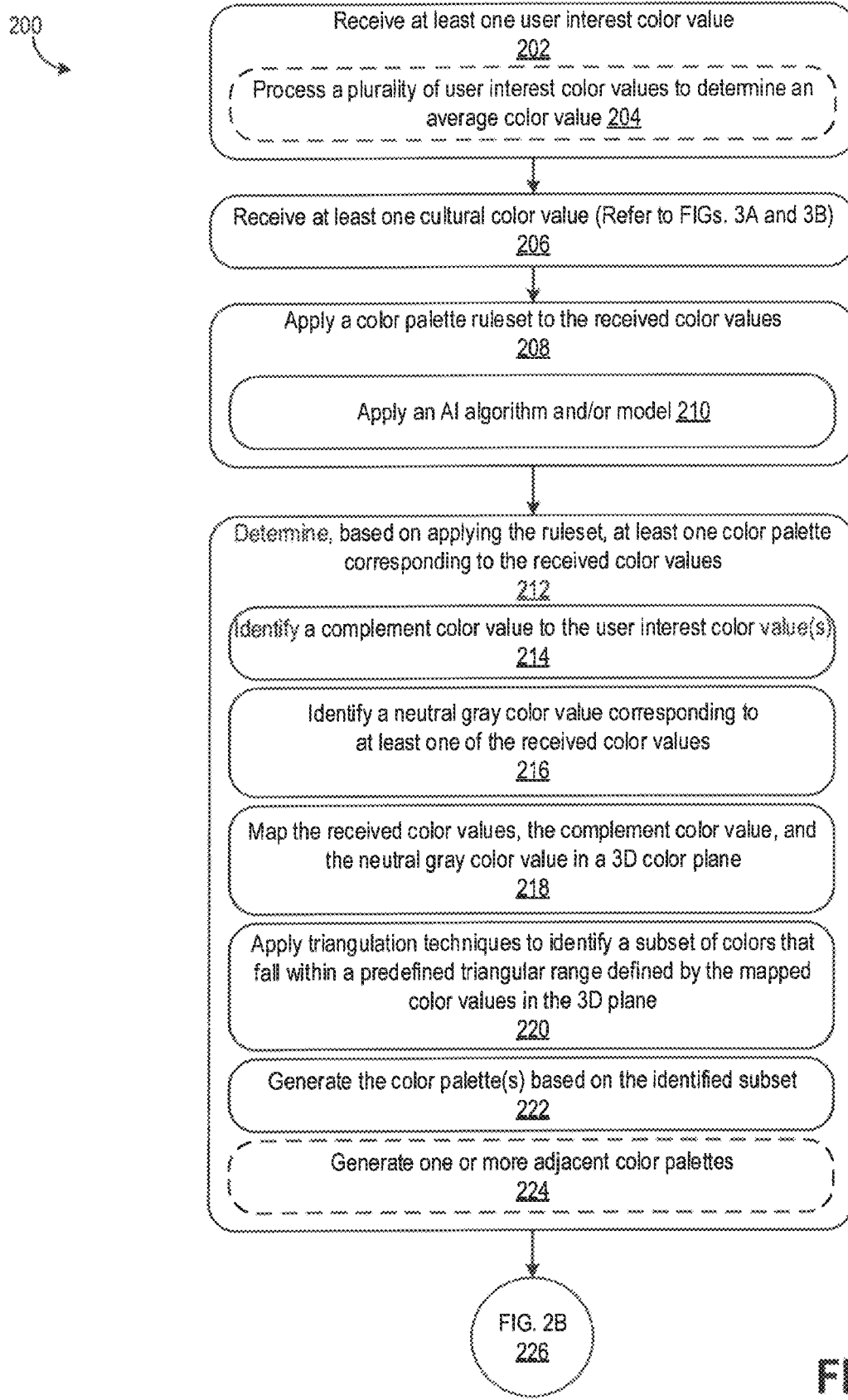
FIGS. 2A and 2B is a flowchart of a process for generating a color palette based on at least one input color value.
Figure 2B:
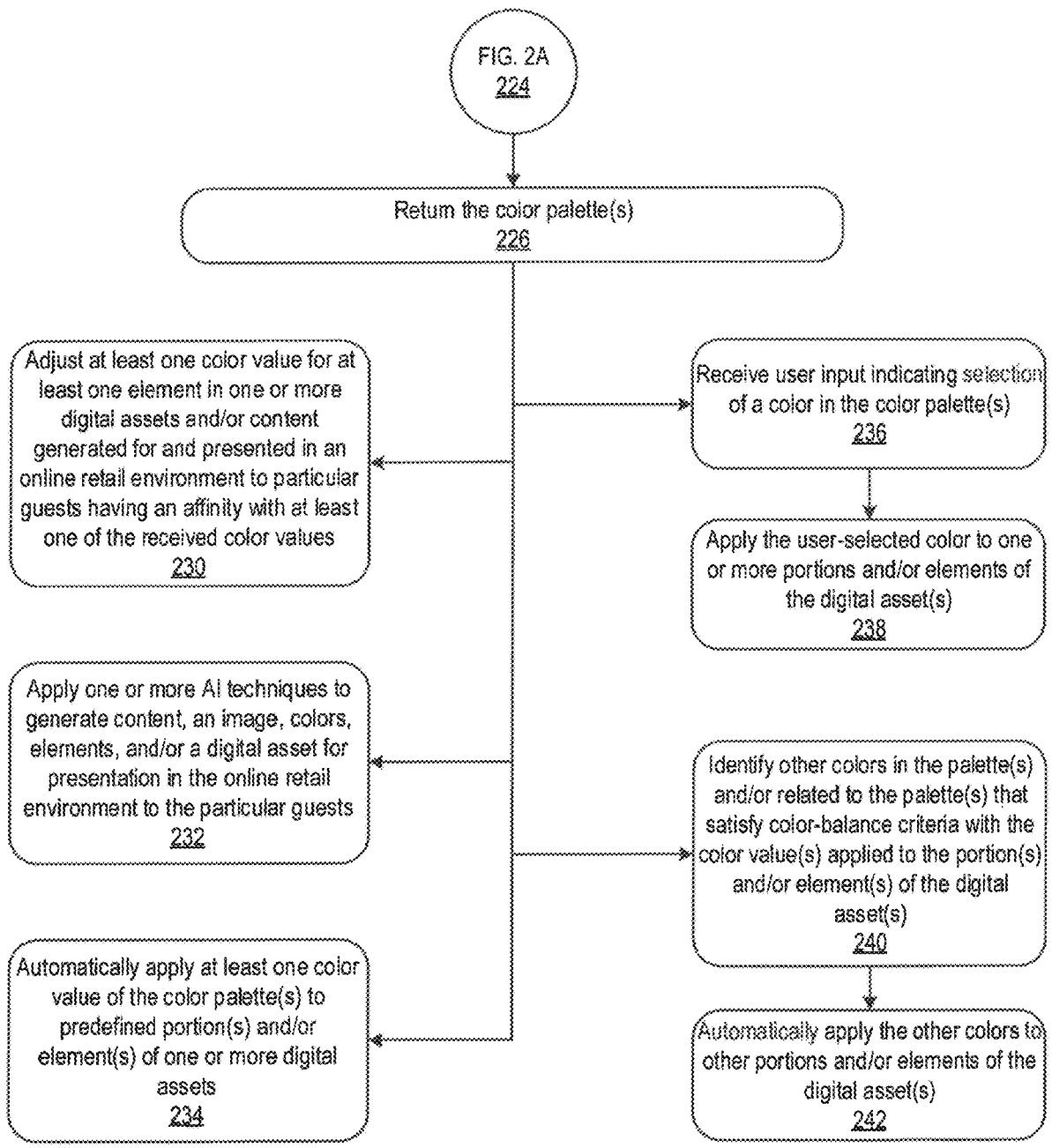

FIGS. 2A and 2B is a flowchart of a process 200 for generating a color palette based on at least one input digital color value. The process 200 can be performed by the computer system 102. The process 200 can also be performed by one or more other computing systems, devices, computers, networks, cloud-based systems, and/or cloud-based services. For illustrative purposes, the process 200 is described from the perspective of a computer system.

Referring to the process 200 in FIGS. 2A and 2B, the computer system can receive at least one user interest color value in block 202. Optionally, the computer system may process a plurality of user color values to determine an average user interest color value (block 204). Refer to FIGS. 1A and 1B for further discussion about the user interest color value(s). Sometimes, as another example, the at least one user interest color value may include thematic colors, such as colors relating to a season (e.g., fall, winter, spring, summer) and/or a holiday. The thematic colors may be used in addition to the other user interest color values (e.g., user-specified favorite colors, preferred colors, eye color, hair color, skin tone, other user attribute colors) to generate a color palette, select/identify colors to add to the color palette, and/or select a color palette amongst a group of different color palettes to be used as described herein.

The computer system can also receive at least one cultural color value in block 206. As described further in reference to FIGS. 3A and 3B, various color values can be extracted and/or identified from a variety of sources, including but not limited to images, packaging, materials, clothing, food, social media, labels etc., that represent a particular culture of interest (e.g., to a particular user and/or in association with a particular product and/or digital asset for the retail environment). The computer system may assess different shades of colors across the different sources representing the culture to identify a most common color (or colors) representative of the culture.

Sometimes, the computer system can apply an AI algorithm and/or model that is trained to receive the different shades of colors as inputs and output the most common color(s). The algorithm and/or model can be trained to apply biases to the inputs, which can cause the algorithm and/or model to generate a robust and accurate identification of the most common color(s) for the particular culture. As an illustrative example, the computer system can identify a most common culture for Asian cultures. Some of the inputted color values may include shades of red that are identified from objects directly from the Asian cultures while other inputted color values may include other shares of red that are identified from objects provided by another culture that are intended to represent the Asian cultures. By applying biases to these inputted color values, the computer system can identify which shade of red is in fact representative of authentic Asian cultures rather than which shade of red is used by other cultures to represent the Asian cultures.

The most common color(s) identified in block 206 can be used by the computer system as the at least one cultural digital color value and/or as part of a color palette that identifies/represents the culture.

The computer system can apply a color ruleset to the received color values in block 208. For example, the computer system may apply an AI algorithm and/or model (block 210), as described further herein. The ruleset, algorithm, and/or model can be used to identify how the color values may be represented in n-dimensional color space and to determine associations with other colors that may complement the received color values.

The computer system can determine, based on applying the ruleset, at least one color palette corresponding to the received color values (block 212). For example, the computer system can identify a complement color value to the user interest color value(s) (block 214). The complement color value can be determined using color theory techniques and mapping of the user interest color value(s) in n-dimensional color space.

The computer system can identify a neutral gray digital color value corresponding to at least one of the received color values in block 216. The computer system may implement color theory techniques described further below to identify the neutral gray color value.

The computer system can also map the received color values, the complement color value, and the neutral gray color value in a 3D digital color plane (e.g., n-dimensional color space) (block 218). Sometimes, the computer system can map any of these color values as they are determined and/or processed by the computer system. For example, the computer system may map the received color values in the 3D color plane to then determine the complement color value (block 212) and/or the neutral gray color value (block 216). The blocks 212, 214 and 216 may be performed in one or more other orders and/or simultaneously.

The computer system can apply triangulation techniques to identify a subset of colors that fall within a predefined triangular range defined by the mapped digital color values in the 3D plane (block 220). Accordingly, the computer system can generate the color palette(s) based on the identified subset of colors (block 222). Optionally, the computer system may generate one or more adjacent color palettes to the generated color palette(s) (block 224). To compose any of the palettes described herein, the computer system can apply one or more contrast color rulesets to see how colors in the predefined triangular range relate to each other and/or to the mapped color values. The one or more contrast color rulesets may include: contrast of value, of chroma, of hue, of warm and cool, of complementary and supplementary, of quantity, of simultaneous contrast, and/or of chromostereopsis contrast. One or more other rulesets may be applied to generate any of the color palettes described herein. Generating the color palette(s) may include generating the digital color palette(s) in an output digital color scheme based on the identified subset of digital color values. For example, the computer system can digitally translate the identified subset of digital color values from respective input digital color formats to the output digital color scheme. For more discussion about performing blocks 212-224, refer to at least FIGS. 5, 6, 7A, and 7B.

In block 226, the computer system can return the color palette(s). Returning the color palette(s) can include storing the color palette(s) in a data store described herein. Returning the palette(s) can include transmitting the palette(s) to one or more relevant user computing devices. In some implementations, the computer system can perform any one or more additional or other operations in response to returning the color palette(s), as referenced by blocks 230-242.

For example, in block 230, the computer system may adjust at least one digital color value for at least one element in one or more digital assets and/or content generated for and presented in an online retail environment to particular guests having an affinity with at least one of the received color values. The computer system can receive and/or retrieve a digital asset and/or content, such as a marketing campaign and/or an advertisement or content story, that can be delivered to the guests having the affinity with the received color value(s). The affinity can be defined based on the guests having the same favorite color(s), eye color, hair color, skin tone and/or hue, cultural color(s) of interest, and/or other user attribute colors. As an illustrative example, all guests that associate with purple hair color may receive advertisements for hair dye and other hair products. These advertisements can be retrieved and/or received by the computer system and then adapted/updated in block 230 using one or more of the colors in the palette(s) that was identified for the associated purple hair color. The computer system can identify editable content and/or graphical elements in the advertisement(s), such as text, backgrounds, images, products, etc. The computer system can then apply one or more of the colors in the palette to the identified elements in the advertisement(s) using one or more content modification criteria. The criteria can indicate, for example, which of the colors in the palette(s) may be used for modifying text elements while other colors in the palette(s) may be used for modifying particular portions/aspects of the images and/or products. Various other criteria may also be used by the computer system to determine how to modify the digital assets and/or color elements. The modified elements can then be delivered or otherwise served to the guests having the affinity with the received color value(s) (e.g., all guests having some relationship/association with purple hair color). The guest's computing devices can execute instructions provided by the computer system to present the modified elements in an online retail environment that is outputted in respective GUI displays, thereby improving and personalizing the guests experience in the online retail environment.

Additionally or alternatively, the computer system may apply one or more AI techniques to generate content, an image, colors, elements, and/or a digital asset for presentation in the online retail environment to the particular guests (block 232). The computer system can leverage a machine learning model and/or AI algorithms that have been trained to generate the content mentioned above using historically generated and/or modified content and the returned color palette(s). For example, the computer system can provide inputs to a model that include the color palette(s) and an affinity associated with the received color value(s). In the above example of the purple hair color, the affinity may be colorful hair products and styles. The model can be trained to generate advertisements, images, text, marketing materials, and/or products that relate to the colorful hair products and styles affinity, all of which may be designed/generated using colors from the color palette(s). As an illustrative example, the model can output an advertisement for various different color hair highlighting kits where a background of the advertisement can appear in a primary color from the color palette(s) and text in the advertisement can appear in a secondary color from the color palette(s) that complements the primary color. The model can be trained with various color theory rulesets and/or other content creation criteria to automatically design and generate content using the returned color palette(s).

Additionally or alternatively, the computer system may automatically apply at least one color value of the color palette(s) to predefined portion(s) and/or element(s) of one or more digital assets (block 234). As described similarly above in reference to block 230, the computer system can adapt portions and/or elements in existing digital assets to have any of the colors in the color palette(s). The computer system can receive a particular digital asset (e.g., an advertisement or content story) from a user device, such as the device of a content creator for the online retail environment. The digital asset may include predefined labels, sections, containers, and/or other elements that may be edited, modified, customized, or otherwise adaptable. The computer system can apply one or more rulesets described herein to identify which portions and/or elements of the digital asset to modify/adapt with colors from the palette(s) and then apply those modifications. The modified digital asset can then be returned to the user device and/or served directly to relevant guests.

Additionally or alternatively, the computer system may receive user input indicating selection of a color in the color palette(s) (block 236). The computer system may apply the user-selected color to one or more portions and/or elements of the digital asset(s) (block 238). Blocks 236 and 238 can be performed similarly as described above in reference to block 234.

Additionally or alternatively, in block 240, the computer system may identify other colors in the palette(s) and/or related to the palette(s) that satisfy one or more color-balance criteria with the color value(s) applied to the portion(s) and/or element(s) of the digital asset(s). The computer system may automatically apply the other colors to other portions and/or elements of the digital asset(s) in block 242. As described further below, the computer system can identify one or more complementary colors and/or contrast colors to colors in the palette(s), thereby expanding a set of possible colors that can be used and applied to the digital asset(s). Sometimes, the computer system can provide the identified other color(s) to the user device (of a relevant content creator in the online retail environment) for selection and/or approval before application to the portion(s) and/or element(s) of the digital asset(s). Sometimes, the user device can return user input indicating which of the portions and/or elements of the digital assets the other color(s) should be applied to.

In some implementations, the process 200 may stop after returning the color palette(s) in block 226.

Figure 3A:
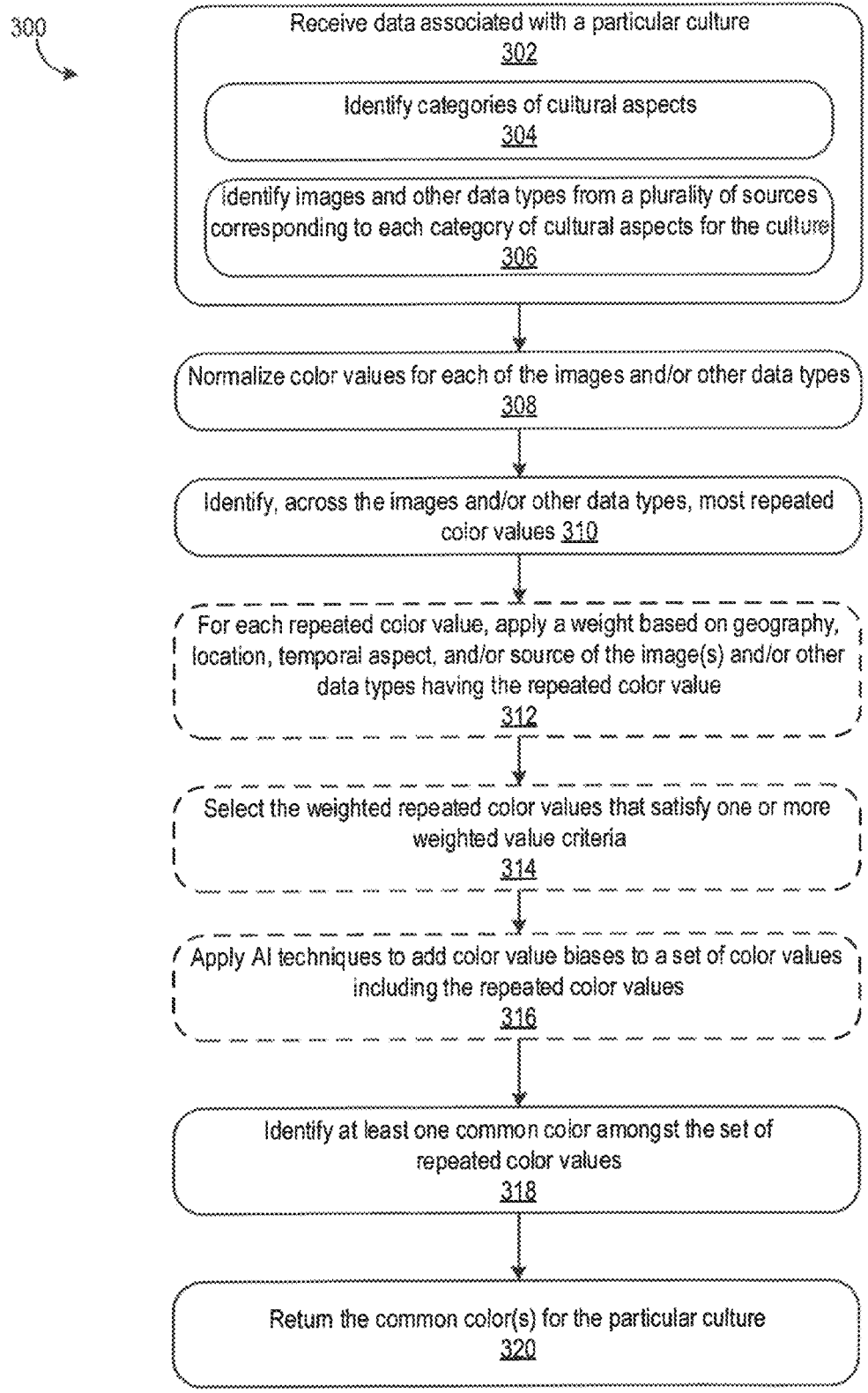
FIG. 3A is a flowchart of a process for determining at least one cultural color value.

FIG. 3A is a flowchart of a process 300 for determining at least one cultural color value. Cultural colors may include most common colors for a given culture that may repeatedly appear during a particular time period, throughout history, in fashion, architecture, food, art, pop culture, music, and/or in one or more geographic regions or locations. The cultural color value(s) identified using the process 300 may then be used in combination with one or more colors described herein, such as colors that a particular guest has an affinity with (e.g., personal affinity, physiological affinity, environmental affinity, colors of interest and/or user attribute colors described throughout this disclosure), to generate unique color palettes for the particular guest, affinity, and/or culture. The resulting color palettes can include a collection of culturally relevant core, every day, and fashion color palettes that may enhance, complement, and/or support user interest color values and undertones of such user interest color values.

The process 300 can be performed by the computer system 102 described herein. The process 300 can also be performed by one or more other computing systems, devices, computers, networks, cloud-based systems, and/or cloud-based services. For illustrative purposes, the process 300 is described from the perspective of a computer system.

Referring to the process 300 in FIG. 3A, the computer system receives data associated with a particular culture in block 302. The data can be received from a computing device of a relevant user, such as a content creator for an online retail environment. The content creator may desire to identify color values for the particular culture, which the content creator may then use to design/create/modify digital assets highlighting products that are associated with the particular culture. Sometimes, the computer system can retrieve the data associated with the particular culture at predetermined time intervals, such as every day, every 3 days, every week, every month, every quarter, etc. The computer system may accordingly update the most common culture color values for the particular culture at the predetermined time intervals, thereby ensuring that the most common culture color values take into consideration new pop culture, art, food, packaging, music, etc.

As part of block 302, the computer system can identify categories of cultural aspects for which to select the data (block 304). The categories, as described herein, may include but are not limited to pop culture, literature, fashion, architecture, holidays, social movements, music, food, history, etc. The computer system can then identify images and other data types from a plurality of sources corresponding to each of the identified categories of cultural aspects for the culture (block 306). The other data types may include clothing, books, CDs, cover art, movies, movie art, posters, advertisements, architectural structures, food packaging, etc.

As an illustrative example of block 306, the computer system can access one or more data stores, repositories, and/or computing systems to search for the images and other data types corresponding to the identified categories. The computer system may also receive from another computing system/device the images and/or other data types that correspond to the identified categories. Sometimes, the computer system may receive data from digital databases that corresponds to images, real-life materials and substrates, and any other information that can be read by a color spectrophotometer and indicative of the identified categories.

The computer system can normalize digital color values for each of the images and/or other data types in block 308. For example, the computer system can apply a machine learning model and/or AI algorithms to the images and/or other data types that was trained to identify elements and/or features in the images and other data types that may be include cultural color values. The model and/or algorithms can identify the elements in the images and other data types then extract a color value (or range of color values) associated with the identified elements. The extracted color values can then be normalized (by the computer system and/or by applying a machine learning model and/or AI algorithm) or otherwise processed.

As another illustrative example, for a given culture, the computer system can identify colors using a spectrophotometer and break down the colors to their respective RGB values. The computer system can then group the RGB color values by closest hue to identify overlap in values. The overlapping RGB values can be identified as most repeated color values for the culture.

Accordingly, in block 310, the computer system can identify, across the images and/or other data types, most repeated color values. For example, the computer system can process a plurality of colors (which can be identified from hundreds of years of history associated with the particular culture) from the data representing the culture to determine an average cultural value. The computer system can identify the most repeated color values within one or more color value ranges. The computer system can find an average color value for a range of colors (e.g., hues or shades of a particular color) that appear most often in the images and/or other data types for the particular culture.

The computer system can then proceed to block 318, described below, or continue through one or more of optional blocks 312-316.

Optionally, for each repeated color value, the computer system can apply a weight. The weight can be based on geography, location, a temporal aspect, and/or a source of the image(s) or other data types having the repeated color value (block 312). For example, a repeated color value that appears in a more recent timeframe (e.g., the past several years in comparison to 100 years ago), may be weighted more than a color value that appears less frequently in the more recent timeframe and more frequently in prior, older timeframes. As another example, a repeated color value that appears in data that is more closely associated with a geographic epicenter of the particular culture (e.g., architectural structures in the capital of a country having its own unique culture) may be weighted more than color values in data that is associated with geographic locations further away from the epicenter of the culture.

Optionally, in block 314, the computer system can select the weighted repeated color values that satisfy one or more weighted value criteria. The computer system can rank the repeated color values based on their weights, from highest weight to lowest weight. The computer system can then select a highest ranked color value (or a subset of the highest ranked color values). The selected color value can represent a common color for the particular culture. One or more other weighted value criteria can be used to select a common color for the particular culture.

Optionally, in addition to or instead of blocks 312 and/or 314, the computer system may apply AI techniques to add color value biases to a set of color values including the repeated color values. The biases may be added in order to differentiate between repeated color values that in fact represent the particular culture and repeated color values that appear to represent the particular culture. For example, the computer system can sample colors from authentic cultural references and also sample colors through the lens of another culture and/or cultural fusion. The colors from the other culture(s) and/or cultural fusion may be applied as biases to the original colors from the authentic cultural references in order to maintain cultural color integrity.

The computer system can then identify at least one common color amongst the set of repeated digital color values in block 318. Block 318 can be performed after block 310. Block 318 can be performed after one or more of blocks 312, 314, and 316. Identifying the common color(s) can include cross-referencing colors in the set to identify commonalities amongst the colors and then selecting the color(s) having the most commonalities in the set. As another example, the computer system can apply one or more rulesets and/or criteria to select the most common color(s) as representative of the culture (e.g., ranking the repeated color values then selecting the top ranked color value in block 310, ranking the weighted color values then selecting the highest ranked color value in blocks 312 and/or 314, identifying the common color(s) amongst the color value biases in block 316).

In block 320, the computer system returns the common color(s) for the particular culture. Similar to color palettes described herein, the computer system can transmit the common color(s) for the culture to one or more user devices, such as the device of the content creator described above. The computer system can transmit the common color(s) for the culture to a data store, for storage and later retrieval. As another example, the computer system can use the common color(s) for the culture in one or more other techniques described herein, such as in determining color palettes in the process 200 of FIGS. 2A and 2B.

Figure 3B:
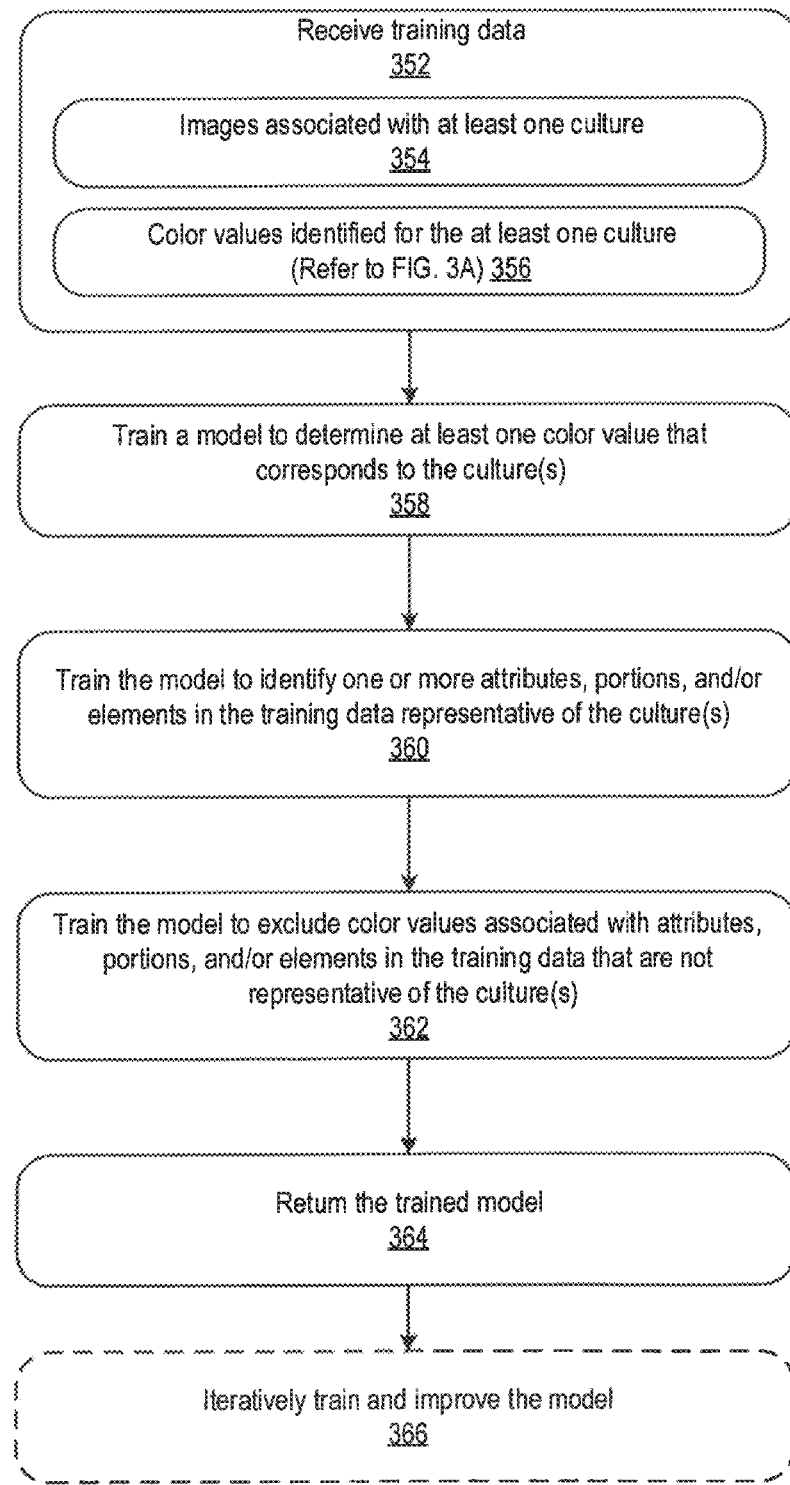
FIG. 3B is a flowchart of a process for training a model to identify color values, such as cultural color values, from a variety of input images.

FIG. 3B is a flowchart of a process 350 for training a model to identify digital color values, such as cultural color values, from a variety of input images. The process 350 can be performed to train one or more different types of models, including but not limited to machine learning models, AI algorithms, deep learning models, neural networks, etc. The process 350 may also be performed to train one or more different types of computer-based algorithms and/or techniques (e.g., AI algorithms and/or techniques).

The process 350 can be performed by the computer system 102 described herein. The process 350 can also be performed by one or more other computing systems, devices, computers, networks, cloud-based systems, and/or cloud-based services. For illustrative purposes, the process 350 is described from the perspective of a computer system.

Referring to the process 350 in FIG. 3B, the computer system receives or retrieves training data in block 352. The training data may include images associated with at least one culture (block 354). The training data may additionally or alternatively include other data types associated with the culture(s), as described in reference to the process 300 in FIG. 3A. The training data may also include color values that have been previously identified for the at least one culture (block 356). The colors may be previously identified using the process 300 in FIG. 3A. Sometimes, one or more of the colors may be previously identified by one or more relevant users such as content creators of an online retail environment. The previously identified colors can be labeled and/or annotated in the received training data (e.g., in the images or other data types).

In block 358, the computer system can train a model to determine at least one cultural value that corresponds to the culture(s). For example, the model can be trained to identify particular shades and/or hues of colors that are labeled and annotated in the images as being commonly associated with/represented in the culture(s). The model can be trained to identify particular elements in the images and other data types that have been labeled and/or annotated as having color values commonly associated with/represented in the culture(s). Sometimes, the computer system can train the model to identify colors that are common to each unique culture. As another example, the computer system can train multiple models, where each model is configured to identify colors that are common to a different culture.

The computer system can train the model to identify one or more attributes, portions, and/or elements in the training data representative of the culture(s) (block 360). Block 360 can be performed as part of block 358, in some implementations. As described herein, the training data can include images and other data types that are labeled and annotated to indicate attributes, portions, and elements that may include colors representative of the culture(s). In images of food, as an illustrative example, packaging can be labeled as elements in the images that may be representative of the culture(s). As another example, in images of pop culture artists, clothing, accessories, and/or a background color may be labeled as elements indicative of the culture(s).

The computer system may also train the model to exclude one or more digital color values associated with attributes, portions, and/or elements in the training data that are not representative of the culture(s) (block 362). In some implementations, block 362 can be performed as part of blocks 358 and/or 360. As described above, the training data can include labels and annotations. Some of the labels and annotations may be used to identify the elements in the training data that should be excluded and thus not used to identify one or more cultural color values. As an illustrative example, in block 360, the model can be trained to identify clothing that are labeled in images, and in block 362, the model can be trained to exclude grass or other culture-agnostic features that are labeled in the same or different images.

Once the model is trained, the model can be returned in block 364. Returning the model can include storing the model in a data store described herein. The model can then be retrieved and used during runtime. Returning the model can include storing the model in local memory of the computer system so that the model can be quickly and efficiently deployed during runtime use at the computer system. In some implementations, returning the model can include transmitting the model to another computing system and/or device for runtime use.

In some implementations, the model can optionally be iteratively trained and improved (block 366). The model can be iteratively trained and improved at predetermined time intervals (e.g., once a day, once a week, once a month, etc.). Sometimes, the model can be iteratively trained and improved whenever new training data and/or data representative of the culture(s) becomes available. As another example, the model can be iteratively trained and improved whenever one or more users (e.g., content creators in the retail environment) generate and/or update digital assets or otherwise create content that may be associated with the culture(s).

Figure 4:
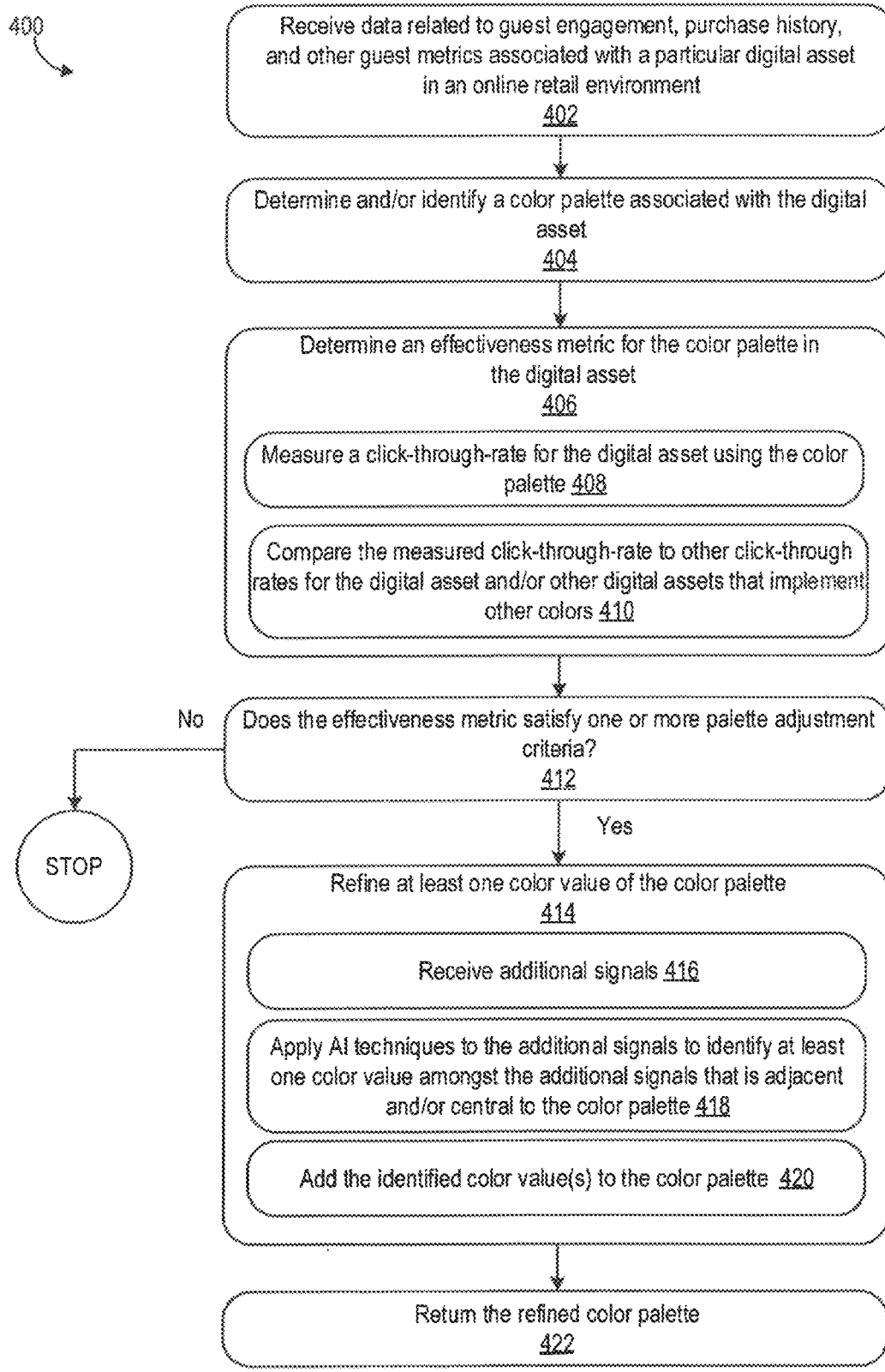
FIG. 4 is a flowchart of a process for a feedback loop to refine color palettes.

FIG. 4 is a flowchart of a process 400 for a feedback loop to refine color palettes. As described herein, the process 400 can be used to determine what colors in a color palette may be most and/or least effective in engaging guests when presented in an online retail environment. The color palettes can be automatically and dynamically updated based on analysis of the guest engagement. The updated color palettes may be automatically and dynamically applied to one or more products and/or digital assets that are generated and presented to various guests in the retail environment.

The process 400 can be performed by the computer system 102 described herein. The process 400 can also be performed by one or more other computing systems, devices, computers, networks, cloud-based systems, and/or cloud-based services. For illustrative purposes, the process 400 is described from the perspective of a computer system.

Referring to the process 400 in FIG. 4, the computer system may receive data related to guest engagement, purchase history, and/or other guest metrics associated with a particular digital asset in an online retail environment (block 402). In some implementations, the data can be received for multiple digital assets. The data can be received for digital assets that are associated with a particular culture. The data can be received for guest engagement in a particular region (e.g., geography). The data can be received for guest engagement during a particular period of time (e.g., a past day, a past week, a past month, a past 6 months). The data can be received for guest engagement during a particular holiday and/or season, in some implementations. The received data can indicate what digital assets the guests selected, how much time the guest spent viewing a particular product linked to a selected digital asset (e.g., based on how long a graphical user interface (GUI) at the guest's computing device remains idle and/or on a particular webpage or other presentation of the product), whether the guest added the product to their cart, how long the product remained in the guest's cart, whether the guest paid for and purchased the product, whether the guest selected or otherwise searched for other products similar to the product(s) in the selected digital asset(s), what products the guest searched for after viewing or selecting the digital asset(s), etc.

The computer system can determine and/or identify a color palette associated with the digital asset in block 404. The computer system can implement any of the techniques described herein to identify what colors are used in the digital asset. For example, the computer system can apply a machine learning model and/or AI techniques to the digital asset to identify colors used in the digital asset that are associated with each other and thus define the color palette. In some implementations, the digital asset may include metadata having a link or other unique identifier to a predetermined color palette. The computer system can then process the metadata and use the unique identifier to identify the color palette. The color palette may be stored in a data store described herein.

In block 406, the computer system can determine an effectiveness metric for the color palette in the digital asset. The effectiveness metric can be a measure a likelihood that the colors used in the digital asset influence guest engagement with the digital asset and products associated with the digital asset. The effectiveness metric can be a numeric or integer value. A higher effectiveness metric value, for example, the more effective the color palette associated with the digital asset may be in promoting guest engagement.

To determine the effectiveness metric, the computer system can measure a click-through-rate (CTR) for the digital asset using the color palette (block 408). The higher the CTR, the more likely the color palette used in the digital asset improves or increases guest engagement with the digital asset. The computer system may also compare the measured CTR to other CTRs for the digital asset and/or other digital assets that implement other colors (block 410). For example, the computer system may compare the CTR for the digital asset using the color palette to CTRs for the digital asset when other colors are used. If the CTR is higher for the digital asset using the color palette than for the other versions of the digital asset using different colors, then the computer system can determine an effectiveness metric above a threshold value for the digital asset using the color palette. As another example, the computer system can compare the CTR for the digital asset using the color palette to CTRs for other digital assets using the same color palette. The computer system may determine that the color palette is most effective for the digital asset having the highest CTR.

In some implementations, the computer system can perform similar techniques to determine an effectiveness metric for each color in the color palette or used in the digital asset. Sometimes, the computer system may determine the effectiveness metric for the color palette as a whole, and that value may be imputed to each color in the palette. One or more weights may be applied to each color's effectiveness metric/value based on one or more weighting factors. For example, a color that covers more surface area, portions, and/or elements in the digital asset (e.g., background, a product, other elements in the foreground of the digital asset) may be weighted more heavily than colors that cover less surface area, portions, and/or elements in the digital asset (e.g., an accent border around the digital asset, an accessory, hair color, skin tone, eye color, nail color, color of items in the digital asset that are not products for purchase in the retail environment).

In some implementations, the computer system can measure effectiveness of the color palette for the digital asset based on measuring behavior changes of a guest (e.g., user). For example, if the guest saves, shares, replicates, and/or posts on social channels a digital image including the color palette colors, then the computer system may determine that the color palette is in fact effective. On the other hand, if the guest starts interacting in online platforms and/or social channels with wholly different colors, the computer system may determine that the color palette is not as effective for the interests of the particular guest.

The computer system can determine whether the effectiveness metric satisfies one or more palette adjustment criteria in block 412. The one or more criteria may be used to determine whether the colors in the palette are sufficient to cause guests to engage with the digital asset that uses the color palette or whether one or more colors in the palette should be replaced with other colors that may improve or increase guest engagement. If the one or more criteria is not satisfied, then the colors in the palette are sufficient for achieving at least a threshold level of guest engagement/ activity with the digital asset. Therefore, the process 400 may stop.

If the one or more criteria is satisfied, then one or more colors in the palette may not be sufficient to cause at least the threshold level of guest engagement/activity with the digital asset. Therefore, the computer system may determine that one or more colors in the palette may be replaced, and the computer system proceeds to block 414. In block 414, the computer system refines at least one color value of the color palette. Refining the at least one digital color value in the palette may include adjusting a contrast, brightness, and/or hue of the color relative to one or more other colors in the palette (e.g., relative to a color that has an effectiveness metric value above some threshold level), which may cause the adjusted color to satisfy one or more color theory rules. As another example, refining the at least one color value may include swapping or replacing the color value with one or more other colors, such as colors that had effectiveness metric values exceeding some threshold value in other digital assets (e.g., other digital assets that are of a same category as the particular digital asset, other digital assets that are associated with a same culture and/or user interest color values, etc.).

As an example of refining the at least one color value of the palette, the computer system can receive additional signals (block 416). The additional signals can include data associated with one or more of geography, seasons, weather, culture, user interests, etc. The data type may include images, videos, food packaging, other types of packaging, marketing materials, products, etc. The additional signals may be associated with a particular time period, such as a current day, a past day, a past couple days, a past week, a past month, etc.

The computer system may apply AI techniques to the additional signals to identify at least one color value amongst the additional signals that is adjacent and/or central to the color palette (block 418). The AI techniques may include any of the models, algorithms, and/or rulesets described throughout this disclosure, which may be used to identify features in images and other data types that include colors representative of cultures, user interests, etc. The AI techniques may be used to extract colors in the relevant features in the additional signals. The AI techniques may employ one or more color theory techniques and/or rulesets that can be used to identify colors in the additional signals that are adjacent and/or central to colors in the existing palette. The identified colors from the additional signals may be weighted and ranked (e.g., based on type of feature in which they are identified, based on type of signal in which the colors appear, based on how adjacent and/or central they are relative to colors in the palette having respective effectiveness metric values that exceed some threshold value).

In block 420, the computer system may add the identified color value(s) to the color palette. The computer system may additionally or alternatively swap a color in the palette with the identified color value(s). For example, the computer system can swap out the color in the palette having the lowest effectiveness metric score with the identified color value(s). As another example, the computer system can randomly select one of the colors in the palette having an effectiveness metric score that is less than a threshold value to swap out with the identified color value(s).

The computer system can then return the refined color palette in block 422. The refined color palette can be stored in a data store, as described herein. The refined color palette can be transmitted to one or more computing devices of relevant users (e.g., content creators) in the retail environment. The users may then implement the refined color palette in the digital assets they generate and/or modify. Sometimes, the computer system can automatically modify one or more of the digital assets using the colors in the refined color palette.

Overtime, the computer system can measure CTRs for the digital assets that are modified using the refined color palette to determine whether the added or swapped colors improve guest engagement in the retail environment. This can become an iterative process used by the computer system to automatically refine color palettes, modify digital assets, and improve guest engagement and experiences with the retail environment.

Figure 5:
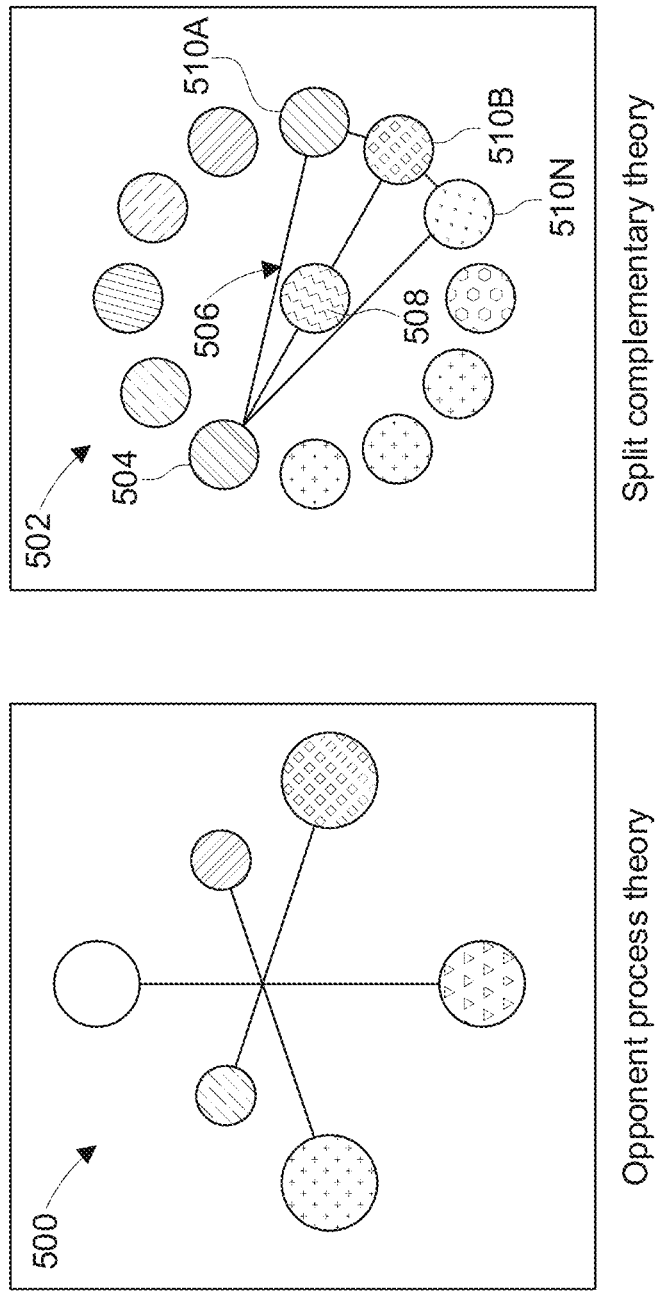
FIG. 5 illustrates an example 3D color plane and a complementary color wheel used with the disclosed techniques.

FIG. 5 illustrates an example 3D color plane 500 and a complementary color wheel 502 used with the disclosed techniques. In order to align relationships of palette colors to user interest digital color values, color theories, such as Opponent Process Theory and Split Complimentary Theory, may be leveraged to generate harmonious color palettes. The human eye seeks equilibrium by spontaneously generating complements of colors it sees, which forms neutral gray and balance in perception.

As shown in FIG. 5, colors can fit into the three-dimensional (3D) plane 500 to help visualize how and what colors complement each other and thus may be used to form a color palette. Triangulation techniques described herein may be used to determine where colors may fall within range to a particular color. As an illustrative example, in the color wheel 502, a particular color 504 is selected as the primary color (e.g., user interest color value) for a color palette. Using triangulation and color theory techniques described herein (refer to FIGS. 6, 7A, and 7B), a computer system (e.g., the computer system 102) is able to determine a triangular range 506 used for identifying complement colors 510A-N to the particular color 504, while maintaining balance in perception with a neutral gray color 508. The complement colors 510A-N may be added to a color palette along with the particular color 504.

Figure 6:
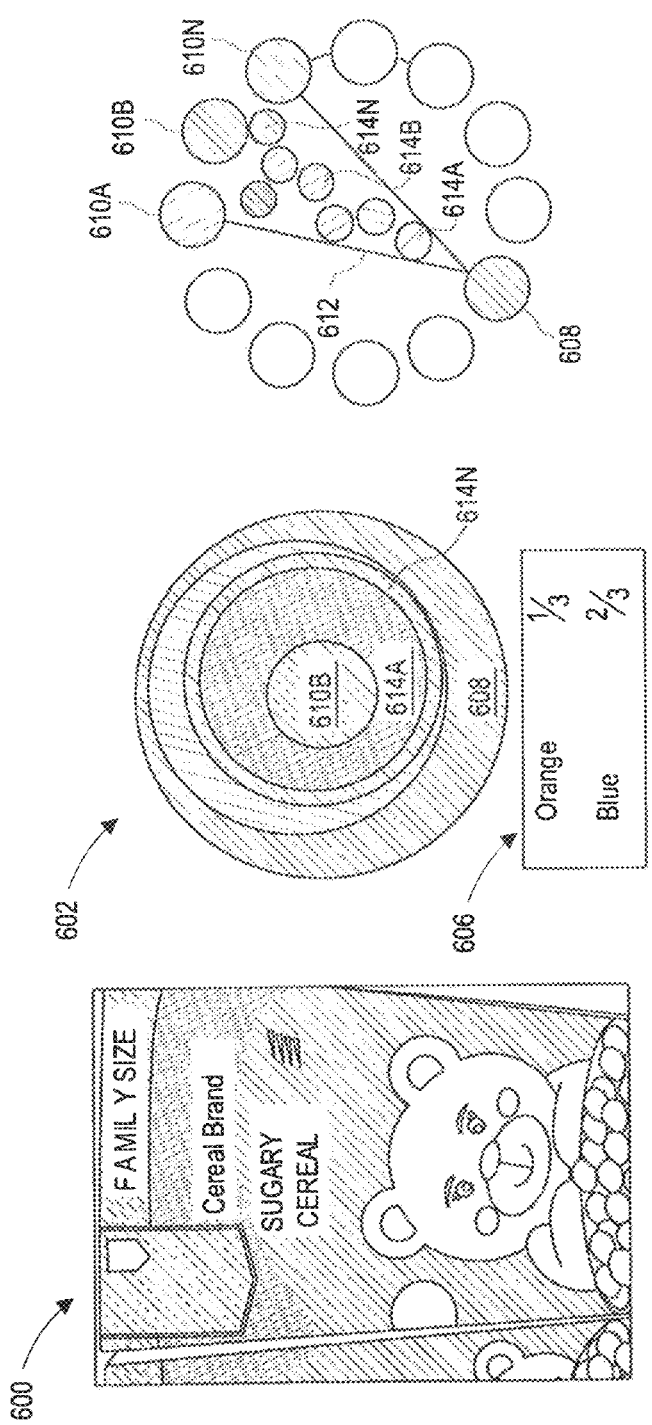
FIG. 6 is an illustrative example of identifying a color palette corresponding to a product using the disclosed techniques.

FIG. 6 is an illustrative example of identifying a digital color palette 602 corresponding to a product 600 using the disclosed techniques. As described in reference to FIG. 5, a particular color 608 can be identified in the product 600 (e.g., a box of cereal) and mapped into a 3D color plane to identify complement colors 610A-N. A computer system may also perform triangulation techniques to define a triangle 612 based on the particular color 608 and a gray neutral color that is used to balance colors that the human eye sees. Various colors 614A-N can be identified within the triangle 612 that satisfy one or more color theory rules and thus may be added to a color palette for the particular color 608. Darker shades of a color within the triangle 612 may indicate colors that are lower in a 3D space along a particular plane or axis. The computer system may also apply one or more rules to the colors 614A-N identified within the triangle 612, the particular color 608, and the complement colors 610A-N to identify a subset of these colors that can be used to define the color palette 602. The rules can be applied to achieve predetermined percentages of colors that complement each other in the color palette 602. As an illustrative example, ⅓ and ⅔ proportions may be used to identify at least two colors that complement each other and thus may be part of the same color palette 602. In the example of FIG. 6, ratios 606 may be used to select one or more of the complement colors 610A-N and the colors 614A-N within the triangle 612. The illustrative ratios 606 indicate that shades of orange may comprise ⅓ of colors in the color palette 602 while shades of blue may comprise ⅔ of color in the palette 602. These ratios may create a harmonious color palette to the human eye, as reflected in the product 600.

Any of the colors 614A-N defined by the triangle 612 in 3D space and/or the complement colors 610A-N may be selected by the computer system and added to the palette 602. In the example of FIG. 6, the color palette comprises the particular color 608 (which may be a primary color used in the product 600, such as on a background of the packaging), the color 614A (a brighter, richer shade of the particular color 608 that is defined within the triangle 612), the complement color 610B (which may be a more muted shade of orange that satisfies one or more complement color criteria with the particular color 608), and the color 614N (a brighter, richer shade of the complement color 610B that is also defined within the triangle 612).

Figure 7A:
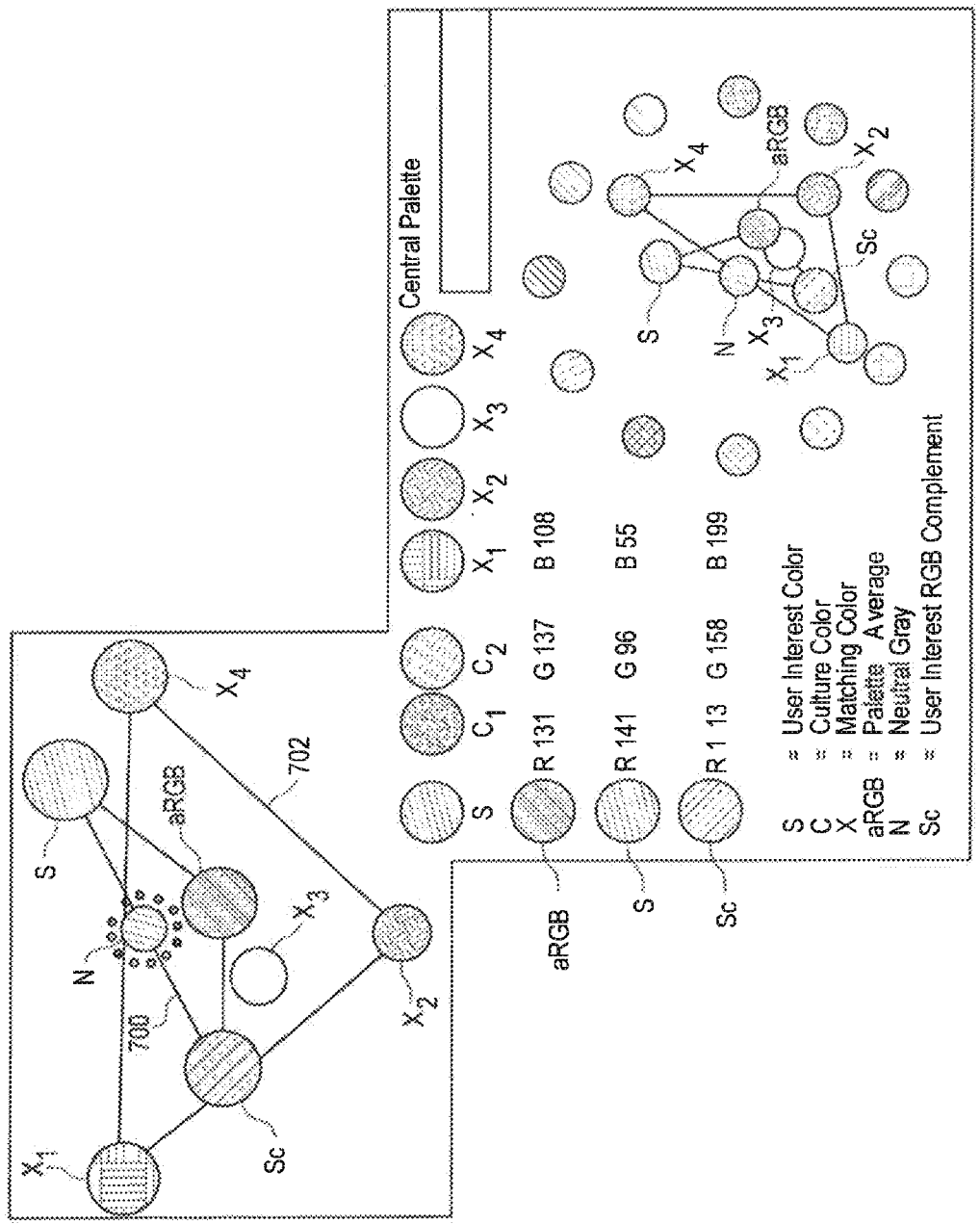
FIGS. 7A and 7B illustrate example color palettes identified for one or more input colors using the disclosed techniques.
Figure 7B:
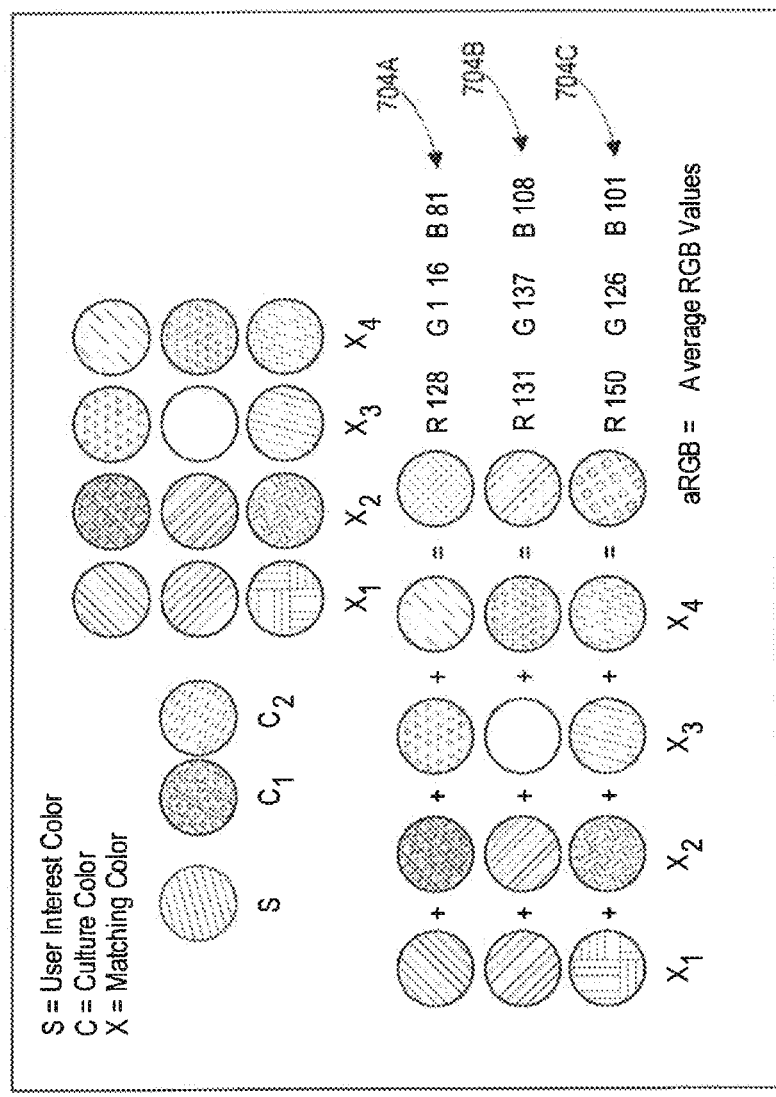

FIGS. 7A and 7B illustrate example color palettes identified for one or more input colors using the disclosed techniques. Referring to both FIGS. 7A and 7B, at least one user interest color value S and at least one culture color value C (e.g., C1, C2) may be used to identify colors to add to a color palette that complements both values S and C. Triangulation techniques may be used to identify potential color values for a color palette, such as color values X1, X2, X3, and X4.

An RGB complement digital color value Sc to the user interest color value S can be identified using color theory techniques described herein. The color value Sc may be an undertone color value for the user interest color value S. A neutral gray color value N may also be identified between the color values S and Sc. The computer system described herein can identify one or more color values that bisect the neutral gray color value N, such as matching color value X1. As described above, the colors are mapped into 3D color space and the computer system can use triangulation techniques to define a triangle 700 intercepting the color values S, Sc, and N. The computer system can determine a color value aRGB as an average color value that may cause an equal distance between the color values S and Sc. In other words, the aRGB color value may be a center point for all input color values (e.g., the color values S, Sc, and/or C). Color values proximate the aRGB color value can then be selected, such as matching color values X2, X3, and/or X4 (e.g., candidate and/or potential colors for a color palette associated with the color values S, Sc, and/or C).

As shown in FIG. 7A, the digital color values X1, X2, and X4 define a triangle 702 in 3D color space, which encompasses the color values Sc, N, X3, and aRGB. The computer system can determine whether any of the color values X1, X2, X3, and X4 fall within an undertone of the neutral gray color value N. As more colors are identified and/or selected, the computer system can iteratively and automatically recalculate the aRGB color value to ensure that when the identified/selected colors are added to a color palette, they do not disrupt centering of the aRGB color value with the color value N between the color values S and Sc. Although colors that are farther in distance to the color value N may be selected for a color palette, colors closest to the color value N may be selected for a central color palette.

Central and adjacent digital color palettes can be generated using the disclosed techniques. Colors that complement the user interest color value S can be identified and added to one or more color palettes. As the colors get added to a palette, the computer system can use triangulation techniques to determine whether the added color(s) continue to complement the user interest color value S or deviate from being complementary by more than a threshold range of deviation or distance in the 3D color space. Laws of simultaneous contrast can be automatically applied by the computer system to identify how and which supplemental pairs of colors accentuate each other to the human eye, and therefore can be considered members of a same palette. In the example of FIGS. 7A and 7B, a same user interest color value S can be used for defining various different color palettes, all of which may provide balanced perception and equilibrium to the human eye when paired with the user interest color value S.

As shown in FIG. 7B, multiple color palettes 704A-C can be defined using the disclosed techniques. In this illustrative example, color palette 704B is a central color palette associated with the user interest color value S and cultural color values C1 and C2. Color palettes 704A and 704C are defined as adjacent color palettes. The computer system can iteratively and/or continuously generate innumerable color palettes that may be used for different types of digital assets and/or categories of digital assets (e.g., foundational products and/or uses, everyday products and/or uses, and/or expressive products and/or uses). The computer system may continuously generate and/or update/modify the color palettes based on evolving guest interests, guest engagement, cultural changes, etc.

Figure 8A:
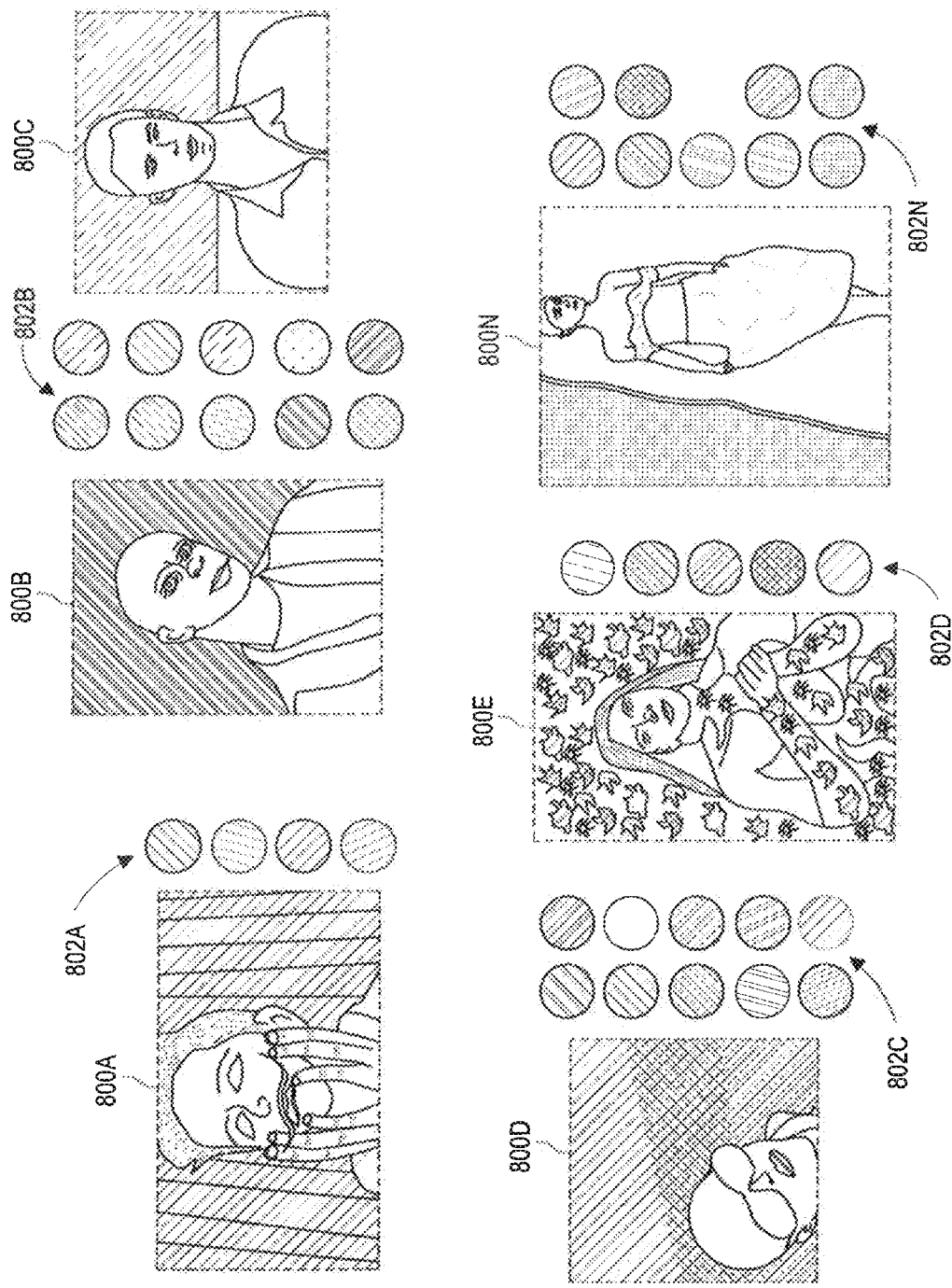
FIG. 8A illustrates example images and corresponding colors that may be identified for a particular culture using the disclosed techniques.

FIG. 8A illustrates example images 800A-N and corresponding color sets 802A-N that may be identified for a particular culture using the disclosed techniques. As described herein, the computer system described herein can implement modeling and/or AI techniques to identify most common and/or prominent colors that may be associated with a particular culture. The computer system may continuously identify data points and signals (e.g., images, videos, products, packaging, digital advertisements, marketing materials) associated with the particular culture and process the colors in those data types to determine the most common and/or prominent colors for the culture at a present time (or over some predetermined period of time). As a result, colors of products associated with the culture can be updated in real-time or near real-time to reflect evolving changes in the culture.

The computer system can analyze the various data points and signals that reflect architecture, posters, food, food packaging, photography, actors, folk art, contemporary artists, fine arts, paintings, murals, markets, celebrities, social media, banners, flags, representations of the culture as created by the culture, representations of the culture as created by other cultures, etc. By analyzing these data types, the computer system may extrapolate prominent colors therein and then identify commonalities amongst the prominent colors across the data points and signals (or a portion thereof). One or more most common colors across the data points and signals may be selected as colors representative of the culture.

In the example of FIG. 8A, the example images 800A-N represent contemporary artists associated with a particular culture during a particular period of time (e.g., a current time period). Using the disclosed techniques, the computer system extrapolates the colors 802A-N from each of the respective images 800A-N. As shown across the extrapolated colors 802A-N, shades of green appear over all the images 800A-N. The computer system may determine that one or more of the shades of green are likely the most common colors for the culture.

FIG. 8B illustrates an example color map 804 for a particular culture, such as the culture described in reference to FIG. 8A. The common color(s) identified in FIG. 8A may include only some of the colors representative of the culture. As shown in FIG. 8B, a subset of colors can be identified as a digital color palette 806 for the culture, and based on the color map 804. The color map 804 can include a plurality of common colors that have been identified for the particular culture, similar to the colors identified in FIG. 8A. The common colors in the color map 804 may be identified based on processing various data points representing various aspects of the culture, including but not limited to food, fine art, contemporary artists, packaging, etc. The computer system described herein can apply AI techniques to identify commonalities across all the colors in the color map 804 to curate the color palette 806 representative of the culture. The color palette 806 may then be used by the computer system and/or relevant users to create and/or modify digital assets that are associated with the culture and/or products relating to the culture. The color palette 806 may be used by the computer system to generate other color palettes as described herein, where those other color palettes are defined based on one or more user interest color values and the color palette 806 for the particular culture.

FIG. 9 is an example digital asset 900 modified using colors from a digital color palette 920 that is determined using the disclosed techniques. The digital asset 900 can be previously generated and/or designed by a relevant user and/or the computer system described herein. In some implementations, the digital asset 900 may be generated automatically by the computer system and/or portions of the digital asset 900 may be generated automatically. For example, the computer system may employ AI techniques to create a human figure/model that is representative of a particular culture and/or user interest color value that provides the basis for the color palette 920. The computer system may additionally or alternatively generate elements and/or content for the digital asset 900 using the AI techniques, such as text, links, background images, etc.

The digital asset 900 may include one or more modifiable elements 902, 904, 905, 906, 908, 910, 912, 914, 916, and 918. The elements 902-918 can be designed as modifiable by user input provided by one or more relevant users. Additionally or alternatively, the computer system may designate one or more of the elements 902-918 as modifiable. Any one or more of the elements 902-918 in the digital asset 900 may be selected by a relevant user in the online retail environment (e.g., a content creator) and/or the computer system described herein. The user can, for example, select one or more of the elements 902-918 and one or more of the colors in the palette 920 using subjective and/or objective rules regarding aesthetics. As another example, sometimes the relevant user can select a particular color in the palette 920 that they would like to be the most prominent color, then the computer system can determine how to balance colors across the other elements 902-918 in the image by coupling the user-selected color with other colors in the palette 920.

Any one or more of the elements 902-918 may be updated to use one or more colors from the color palette 920. Sometimes, relevant users can designate which of the elements 902-918 to be updated with which colors of interest from the palette 920. Other times, colors may be automatically updated in one or more of the elements 902-918 based on products and what cultures/interests those products are associated with. The computer system can apply one or more rules and/or AI techniques described throughout this disclosure to determine which colors from the palette 920 to apply to which of the elements 902-918 in the digital asset 900. The full color palette 920 can be arranged by hue and saturation, thereby allowing for efficient matching and updating of colors in any of the elements 902-918.

For example, one or more color colors in the palette 920 can be designated for use with foreground or otherwise prominent elements in the digital asset 900, such as elements 902 (a shirt that is available for purchase in the retail environment), 904 (a skirt available for purchase in the retail environment), 912 (a design element on a main, centered portion of the digital asset 900), 910 (a background of the main, centered portion of the digital asset 900), and 908 (a design element on the main, centered portion of the digital asset 900). The rules may also indicate that adjacent, complement, or other colors that are not the core colors in the palette 920 may be applied to less prominent elements in the digital asset 900, such as the elements 905 (a pattern or detail in the shirt that is available for purchase), 906 (a ribbon that is part of the shirt available for purchase), 914 (a male shirt that may or may not be available for purchase), 916 (an accent detail in a kids shirt that may or may not be available for purchase), and 918 (a background/wall color in an off-right portion of the digital asset 900).

The computer system may also apply rules for using similar colors on banners, storytelling, and other marketing features in the online retail environment to improve digital navigation and overall guest experiences. Using similar colors across the online retail environment may help the guests more easily find products of interest and similar products. Additionally, links and fonts may be presented with colors that match a particular culture to assist the guests in navigating to products that are associated with the particular culture. More generally, the disclosed techniques can be used to update one or more other elements and/or features in graphical user interfaces (GUIs) for both website and mobile applications of the online retail environment.

The disclosed techniques may not only aid the guests in more easily navigating the online retail environment, but also increase their CTR and/or call-to-action (CTA) rate. As shown in the below Table 1, using digital color palettes that are generated using the disclosed techniques and based on one or more user interest color values and/or cultural color values significantly CTRs and CTAs.

TABLE 1

CTRs and CTAs based on using the disclosed techniques to generate unique color palettes.

| CTR | | CTA | |
|---|---|---|---|
| | | Benchmark: Industry Baseline (Guests who entered | Results (CTA was to self- |
| Benchmark: Industry Baseline (Average CTR for apparel is ~0.76%) | Results (1.5% CTR - Above average signal; 2% CTR - Strong signal) | the retail environment and took action to a final registration page) | select user interest color values an proceed to an offer page) |
| 2.91% (30/1030 impressions) | First user interest color value (Very strong signal, 3.8x) | 34.15% (28/82) | First user interest color value (Very strong signal, 8x) |
| 1.94% (27/1390 impressions) | Second user interest color value (Above average signal, 2.5x) | 23.68% (18/76) | Second user interest color value (Above average signal, 5.5x) |

As shown in the above Table 1, guests associated with each of the user interest color values exceeded goal metrics by ~2.5-4×. Regarding the CTA metric, where guests provided their contact to request more content, guest activity exceeded the industry average by approximately 2×-9×.

Figure 10:
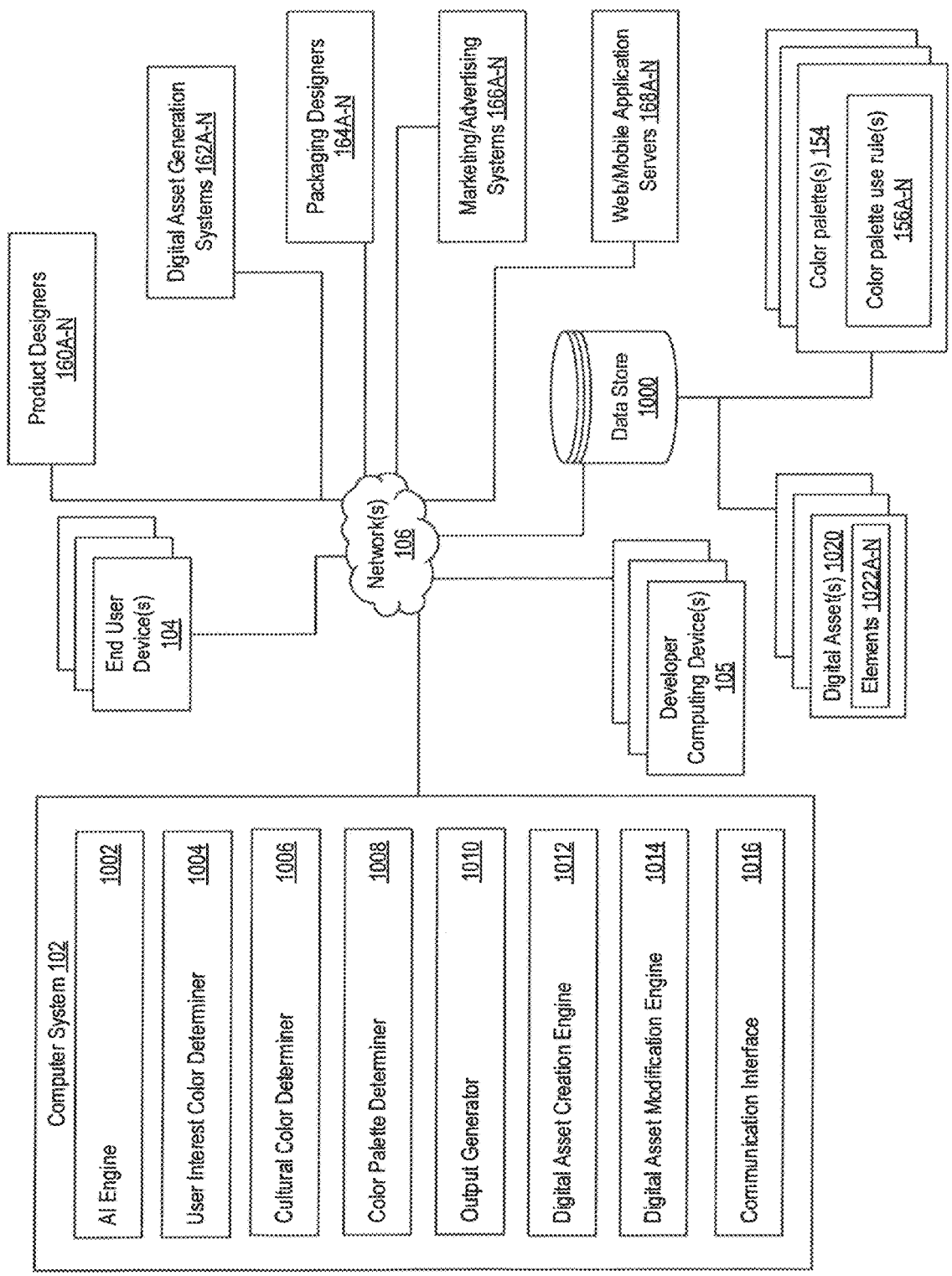
FIG. 10 is a system diagram of components that can be used to perform the disclosed techniques.

FIG. 10 is a system diagram of components that can be used to perform the disclosed techniques. The computer system 102, end user device(s) 104, developer computing device(s) 105, product designers 160A-N, digital asset generation systems 162A-N, packaging designers 164A-N, marketing/advertising systems 166A-N, web/mobile application servers 168A-N, and/or data store 1000 may communicate (e.g., wired, wirelessly) via the network(s) 106. Any one or more of the components 102, 104, 105, 160A-N, 162A-N, 164A-N, 166A-N, and/or 168A-N can be computer systems, networks of computing systems, computing devices, user devices, cloud-based computing systems, mobile phones, smartphones, laptops, tablets, and/or wearable devices. Sometimes, one or more of the components 102, 104, 105, 160A-N, 162A-N, 164A-N, 166A-N, and/or 168A-N may be part of a same computing system and/or network computing devices. In some implementations, one or more of the components 102, 104, 105, 160A-N, 162A-N, 164A-N, 166A-N, and/or 168A-N may be remote from each other. The data store 1000 can be any type of data base, data storage system, and/or cloud-based storage system.

The computer system 102 can be configured to continuously and/or iteratively create, add, and/or update/modify the digital color palettes 154 that are accessible via the data store 1000. The computer system 102 may also be configured to pick and apply one or more of the color palettes 154 to one or more modifiable elements 1022A-N of digital assets 1020. The application of colors from the color palettes 154 may be determined based on the color palette use rules 156A-N associated with each of the color palettes 154. In some implementations, any one or more of the components 105, 160A-N, 162A-N, 164A-N, 166A-N, and/or 168A-N may retrieve the color palettes 154 and their corresponding rules 156A-N from the data store 1000 to apply to the digital assets 1020 that are being created/generated and/or have been previously created/generated.

The computer system 102 may include an AI engine 1002, a user interest color determiner 1004, a cultural color determiner 1006, a color palette determiner 1008, an output generator 1010, a digital asset creation engine 1012, a digital asset modification engine 1014, and a communication interface 1016. The communication interface 1016 can be configured to provide communication between components of the computer system 102 and other components described in FIG. 10. Any one or more of the components 1002, 1004, 1006, and 1008 may be part of a single component and/or configured to perform the same or similar operations. Any one or more of the components 1010, 1012, and 1014 may be part of a single component and/or configured to perform the same or similar operations.

Referring to the components of the computer system 102, the AI engine 1002 can be configured to perform one or more AI techniques, algorithms, and/or models described herein. For example, the AI engine 1002 can implement AI techniques to determine one or more colors to add to a color palette associated with one or more user interest color values and/or cultural color values. Refer to at least the process 200 in FIGS. 2A and 2B for further discussion.

The user interest color determiner 1004 can be configured to identify and/or determine one or more user interest color values. Such an identification/determination can be made by based on data that is received from the respective end user device(s) 104. Refer to at least block A (110) in FIG. 1B for further discussion.

The cultural color determiner 1006 can be configured to determine at least one color value associated with a particular culture. The determiner 1006 can also be configured to determine at least one digital color palette associated with the particular culture. Refer to at least FIGS. 3A, 3B, 8A, and 8B for further discussion.

The color palette determiner 1008 can be configured to generate and/or update/modify one or more of the color palette(s) 154 described herein. The determiner 1008 can receive the user interest color value(s) and/or cultural color values/palette from the respective determiners 1004 and 1006 and apply one or more color palette generation rules/criteria to generate color palettes. Refer to at least FIGS. 1A, 1B, 2A, 2B, 4, 5, 6, 7A, and 7B for further discussion.

The output generator 1010 can be configured to generate one or more recommendations and/or other information about the generated color palette(s). For example, the output generator 1010 can generate notifications and/or messages to be presented at the developer computing device(s) 105 indicating the generated color palette(s). The notifications and/or messages can be outputted in graphical user interface (GUI) displays at the developer computing device(s) 105 and used by the respective user to generate and/or modify one or more digital assets 1020 associated with the retail environment. In some implementations, the output generator 1010 can also provide the color palette use rule(s) 156A-N to the developer computing device(s) 105 to be used by the respective users to determine how to apply colors from the color palette(s) 154 to portions and/or elements 1022A-N of the digital asset(s) 1020.

The digital asset creation engine 1012 can be configured to generate the digital asset(s) 1020. The engine 1012 can automatically generate the digital asset(s) 1020 using AI techniques, as described herein (refer to the process 200 in FIGS. 2A and 2B). The engine 1012 may generate the digital asset(s) 1020 using one or more rules, criteria, and/or inputs from the developer computing device(s) 105, the product designers 160A-N, the digital asset generation systems 162A-N, the packaging designers 164A-N, and/or the marketing/advertising systems 166A-N. In some implementations, the engine 1012 may be part of the digital asset generation systems 162A-N.

The digital asset modification engine 1014 can be configured to modify any of the digital asset(s) 1020 using the determined color palette(s) 154 and the corresponding color palette use rule(s) 156A-N. Refer to at least the process 200 in FIGS. 2A, 2B, and 9 for further discussion. In some implementations, the engine 1014 may be part of the digital asset generation systems 162A-N.

Figure 11:
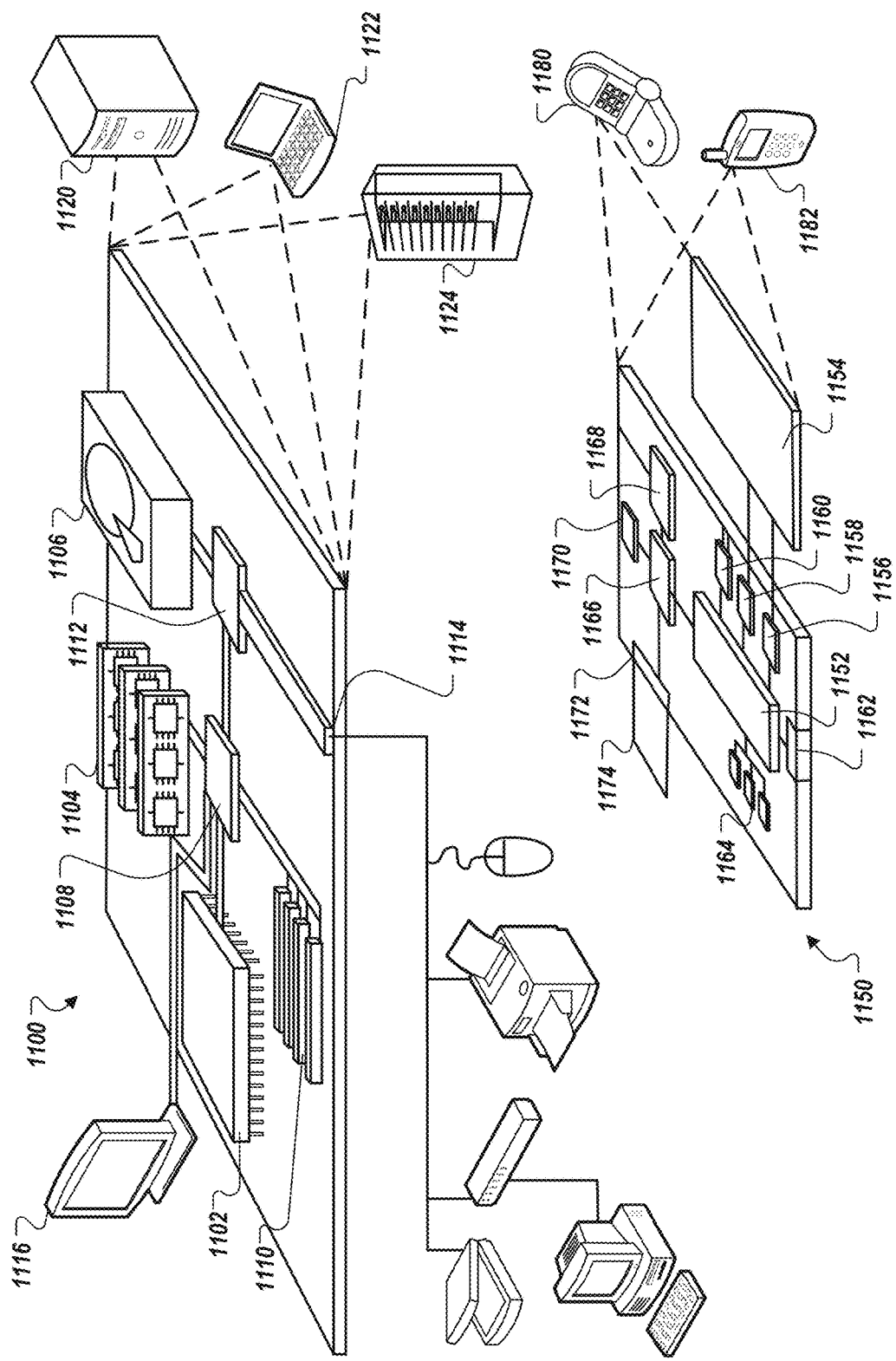
FIG. 11 is a schematic diagram that shows an example of a computing device and a mobile computing device.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this disclosure.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180. It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for automatically generating a digital color palette associated with at least one user interest digital color value, the method comprising:

receiving, by a computer system, at least one user interest digital color value;

retrieving, by the computer system and from a data store, a color palette ruleset, wherein the color palette ruleset comprises a plurality of rules that are each configured to be interpreted by a computer processor and, when interpreted by the computer processor, to provide Boolean outputs indicating whether a corresponding color palette rule is satisfied by candidate digital color values;

applying, by the computer system, the color palette ruleset to the at least one user interest digital color value, wherein the at least one user interest digital color value is provided in an input digital color format;

identifying, by the computer system and based on applying the color palette ruleset, a plurality of digital color values for a digital color palette associated with the at least one user interest digital color value, wherein identifying the plurality of digital color values for the color palette comprises:

identifying a complement digital color value to the at least one user interest digital color value;

identifying a neutral gray digital color value corresponding to the at least one user interest digital color value;

mapping the at least one user interest digital color value, the complement digital color value, and the neutral gray digital color value in a three-dimensional (3D) digital color plane that is represented in the input digital color format; and applying triangulation techniques to the mapped digital color values in the 3D digital color plane to identify a subset of digital color values that fall within a predefined triangular range in the 3D digital color plane according to one or more of the plurality of rules in the color palette ruleset;

generating the digital color palette in an output digital color scheme based on the identified subset of digital color values, wherein generating the digital color palette includes digitally translating the identified subset of digital color values from the input digital color format to the output digital color scheme;

generating, by the computer system, a digital asset for an online retail environment based on applying the plurality of digital color values for the digital color palette associated with the at least one user interest digital color value to one or more modifiable elements of the digital asset;

returning, by the computer system, the digital asset for the online retail environment;

determining, by the computer system, an effectiveness metric for the digital color palette used in the digital asset in the online retail environment; and adjusting, by the computer system, the digital color palette based on determining whether the effectiveness metric satisfies one or more palette adjustment criteria.

2. The method of claim 1, further comprising:

determining, by the computer system and based on applying the digital color palette ruleset, an undertone digital color value for the at least one user interest digital color value; and identifying, by the computer system, the plurality of digital colors values that complement the undertone digital color value according to color theory techniques.

3. The method of claim 1, wherein returning, by the computer system, the digital asset for the online retail environment comprises transmitting the digital asset to an end user device, wherein the end user device is configured to output the digital asset in a graphical user interface (GUI) display of the end user device.

4. The method of claim 1, further comprising: returning, by the computer system, the digital color palette to a developer computing device, wherein the developer computing device is configured to output the digital color palette for selection and modification by a user of the developer computing device.

5. The method of claim 4, further comprising:

receiving, by the computer system and from the developer computing device, user input indicating selection of one of the plurality of digital color values for the digital color palette; and applying, by the computer system, the user-selected digital color value to one or more elements in the digital asset.

6. The method of claim 5, further comprising:

identifying, by the computer system, other digital color values amongst the plurality of digital color values for the digital color palette that satisfy one or more color-balance criteria with the user-selected digital color value; and applying, by the computer system, the identified other digital color values to one or more other elements in the digital asset to complement the one or more elements in the digital asset having the user-selected digital color value.

7. The method of claim 1, wherein the at least one user interest digital color value comprises at least one of a user eye color, user hair color, favorite color, skin tone, skin undertone, and seasonal color.

8. The method of claim 1, further comprising:
generating, based on applying the digital color palette ruleset to the generated digital color palette, at least one adjacent digital color palette, wherein the adjacent digital color palette satisfies one or more of the color theory techniques in relation to the generated digital color palette.

9. The method of claim 1, further comprising:
modifying, by the computer system, at least one previously generated digital asset using the plurality of digital color values for the digital color palette and based on applying the digital color palette ruleset.

10. The method of claim 1, wherein receiving, by a computer system, at least one user interest digital color value comprises:
receiving a plurality of user interest digital color values;
processing the plurality of user interest digital color values to determine an average user interest digital color value; and
applying the digital color palette ruleset to the average user interest digital color value.

11. The method of claim 1, wherein returning, by the computer system, the digital asset for the online retail environment comprises transmitting the digital asset to end user devices associated with users having an affinity with the at least one user interest digital color value.

12. The method of claim 1, further comprising:
receiving, by the computer system, data related to guest engagement, purchase history, and other guest metrics associated with the digital asset in the online retail environment; and
determining, by the computer system, the effectiveness metric for the digital color palette used in the digital asset based at least in part on the received data.

13. The method of claim 12, wherein determining, by the computer system, an effectiveness metric for the digital color palette used in the digital asset comprises:
measuring a click-through-rate (CTR) for the digital asset using the digital color palette; and
comparing the measured CTR for the digital asset to other CTRs for other digital assets that use other digital color palettes that are different than the digital color palette.

14. The method of claim 12, wherein adjusting, by the computer system, at least one of the plurality of digital color values for the digital color palette comprises:
receiving additional signals;
applying AI techniques to the additional signals to identify at least one digital color value amongst the additional signals that is adjacent or central to the digital color palette used in the digital asset; and
adding the identified at least one digital color value to the digital color palette used in the digital asset.

15. The method of claim 14, wherein adding the identified at least one digital color value to the digital color palette used in the digital asset comprises swapping out a digital color value amongst the plurality of digital color values for the digital color palette with the identified at least one digital color value.

16. A method for automatically generating a digital color palette associated with at least one user interest digital color value, the method comprising:
receiving, by a computer system, at least one user interest digital color value;
retrieving, by the computer system and from a data store, a color palette ruleset, wherein the color palette ruleset comprises a plurality of rules that are each configured to be interpreted by a computer processor and, when interpreted by the computer processor, to provide Boolean outputs indicating whether a corresponding color palette rule is satisfied by candidate digital color values;
applying, by the computer system, the color palette ruleset to the at least one user interest digital color value, wherein the at least one user interest digital color value is provided in an input digital color format;
identifying, by the computer system and based on applying the color palette ruleset, a plurality of digital color values for a digital color palette associated with the at least one user interest digital color value, wherein identifying the plurality of digital color values for the color palette comprises:
identifying a complement digital color value to the at least one user interest digital color value;
identifying a neutral gray digital color value corresponding to the at least one user interest digital color value;
mapping the at least one user interest digital color value, the complement digital color value, and the neutral gray digital color value in a three-dimensional (3D) digital color plane that is represented in the input digital color format; and
applying triangulation techniques to the mapped digital color values in the 3D digital color plane to identify a subset of digital color values that fall within a predefined triangular range in the 3D digital color plane according to one or more of the plurality of rules in the color palette ruleset;
generating the digital color palette in an output digital color scheme based on the identified subset of digital color values, wherein generating the digital color palette includes digitally translating the identified subset of digital color values from the input digital color format to the output digital color scheme;
generating, by the computer system, a digital asset for an online retail environment based on applying the plurality of digital color values for the digital color palette associated with the at least one user interest digital color value to one or more modifiable elements of the digital asset;
returning, by the computer system, the digital asset for the online retail environment;
receiving, by the computer system, a cultural digital color value; and
applying, by the computer system, the digital color palette ruleset to the at least one user interest digital color value and the cultural digital color value,
wherein receiving, by the computer system, a cultural digital color value comprises:
receiving an indication of a particular culture of interest;
identifying categories of cultural aspects that are associated with the particular culture;

identifying, from a plurality of data sources, images that correspond to each of the categories of cultural aspects associated with the particular culture; and normalizing digital color values in each of the images.

17. The method of claim 16, further comprising:

identifying, across the images, most repeated normalized digital color values;

weighting the most repeated normalized digital color values;

ranking the weighted digital color values from highest weighted value to lowest weighted value; and selecting a highest-ranked digital color value as a common digital color value associated with the particular culture.

18. The method of claim 17, further comprising: applying, by the computer system, the digital color palette ruleset to the at least one user interest digital color value and the common digital color value associated with the particular culture to generate the digital color palette.

19. The method of claim 16, further comprising:

applying, by the computer system, an AI model to the cultural digital color value to determine a digital color palette for a culture associated with the cultural digital color value, wherein the AI model was trained in a process comprising:

receiving training data, wherein the training data comprises images associated with at least one culture and digital color values identified for the at least one culture; and training the AI model to determine at least one digital color value that corresponds to the at least one culture based on (i) identifying one or more attributes or elements in the training data that are representative of the at least one culture and (ii) excluding digital color values associated with one or more attributes or elements in the training data that are not identified as representative of the at least one culture.

20. The method of claim 16, wherein receiving, by a computer system, at least one user interest digital color value comprises:

receiving a plurality of user interest digital color values;

processing the plurality of user interest digital color values to determine an average user interest digital color value; and applying the digital color palette ruleset to the average user interest digital color value.

* * * * *